United States Patent [19]

Stockstad et al.

[11] Patent Number: 5,818,201

[45] Date of Patent: Oct. 6, 1998

[54] CIRCUIT AND METHOD FOR BATTERY CHARGE CONTROL

[75] Inventors: Troy Lynn Stockstad, Phoenix; Thomas D. Petty, Tempe, both of Ariz.; Renwin J. Yee, Honolulu, Hi.

[73] Assignee: Motorola, Inc., Schaumburg, Ill.

[21] Appl. No.: 814,684

[22] Filed: Mar. 11, 1997

Related U.S. Application Data

[63] Continuation of Ser. No. 398,255, Mar. 3, 1995, abandoned.

[51] Int. Cl.$^6$ ........................................ H02J 7/00
[52] U.S. Cl. ......................... 320/119; 320/118; 320/116
[58] Field of Search ................................ 320/5, 15, 17, 320/18, 130, 30–34, 39–40, 48, 47, 35–36, 118, 119, 120, 121, 122, 116

[56] References Cited

U.S. PATENT DOCUMENTS

| | | | |
|---|---|---|---|
| 3,997,830 | 12/1976 | Newell et al. | 320/39 X |
| 4,061,955 | 12/1977 | Thomas et al. | 320/18 X |
| 4,238,721 | 12/1980 | DeLuca et al. | 320/18 |
| 4,331,911 | 5/1982 | Park | 320/17 |
| 4,616,170 | 10/1986 | Ursoger | 320/18 X |
| 4,622,508 | 11/1986 | Matteau . | |
| 5,063,340 | 11/1991 | Kalenowsky | 320/18 X |
| 5,153,496 | 10/1992 | LaForge | 320/17 |
| 5,162,741 | 11/1992 | Bates . | |
| 5,182,509 | 1/1993 | Simmonds | 320/40 X |
| 5,270,635 | 12/1993 | Hoffman et al. | 320/18 X |
| 5,283,512 | 2/1994 | Stadnick et al. | 320/18 |
| 5,304,915 | 4/1994 | Sanpei et al. | 320/40 X |
| 5,313,152 | 5/1994 | Wozniak et al. | 320/17 X |
| 5,349,668 | 9/1994 | Gladstein . | |
| 5,387,857 | 2/1995 | Honda et al. | 320/18 |
| 5,477,130 | 12/1995 | Hashimoto et al. | 320/15 X |
| 5,493,196 | 2/1996 | Feldstein | 320/39 X |
| 5,493,197 | 2/1996 | Eguchi et al. | 320/5 |
| 5,498,950 | 3/1996 | Ouwerkerk | 320/18 |

FOREIGN PATENT DOCUMENTS

| | | | |
|---|---|---|---|
| 0588615 | 9/1993 | European Pat. Off. | H01J 7/00 |
| 9206525 | 4/1992 | WIPO . | |
| 9310589 | 5/1993 | WIPO | H02J 7/00 |

*Primary Examiner*—Peter S. Wong
*Assistant Examiner*—K. Shin
*Attorney, Agent, or Firm*—Robert D. Atkins

[57] ABSTRACT

A battery charge control circuit (10) senses the charge condition of cells in a battery pack (12, 14, 16, 18) using a measurement circuit (51). Upon detection of a single under-voltage cell, the charge control circuit is placed in a sleep mode. Pack sense circuit (240) senses when the battery pack is placed in a charger. If circuit (10) was in a sleep mode, it is awakened. If any cell is measured over-voltage, the status is checked versus the other cells. If all the cells are over-voltage, the battery is considered balanced. If one or more cells are not over-voltage, a control circuit (32) activates a discharge transistor (212, 214, 216, 218), discharging the cell within a hysteresis voltage below the over-voltage limit. Charge balancing of cells is continued until the cells are within a programmable hysteresis voltage of each other.

24 Claims, 9 Drawing Sheets

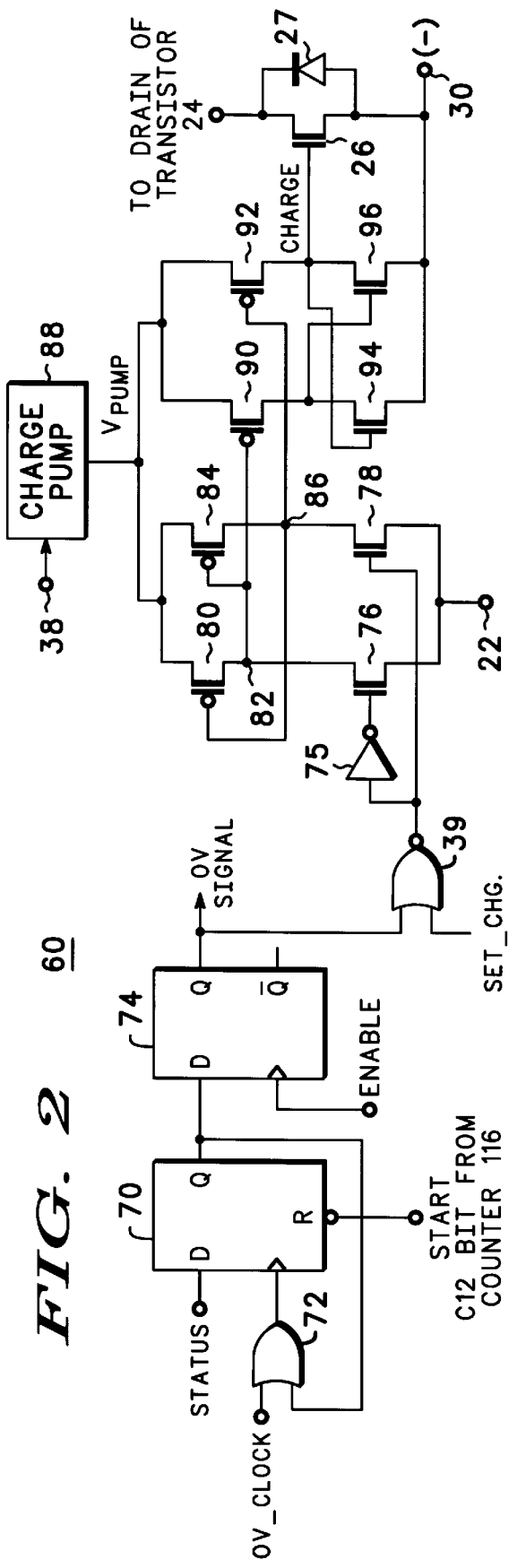
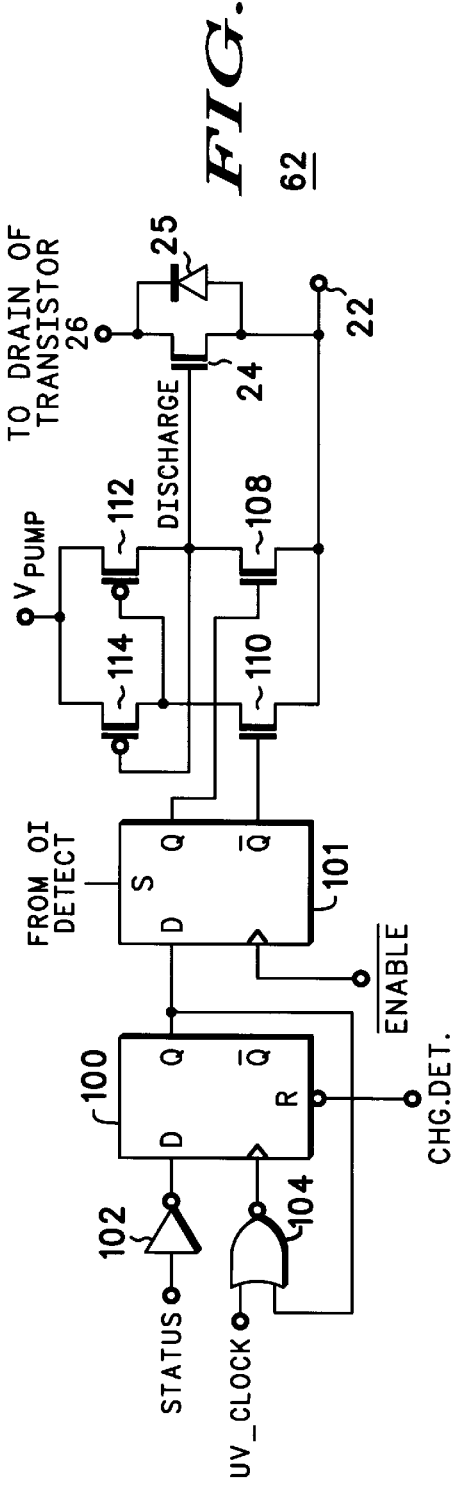

130

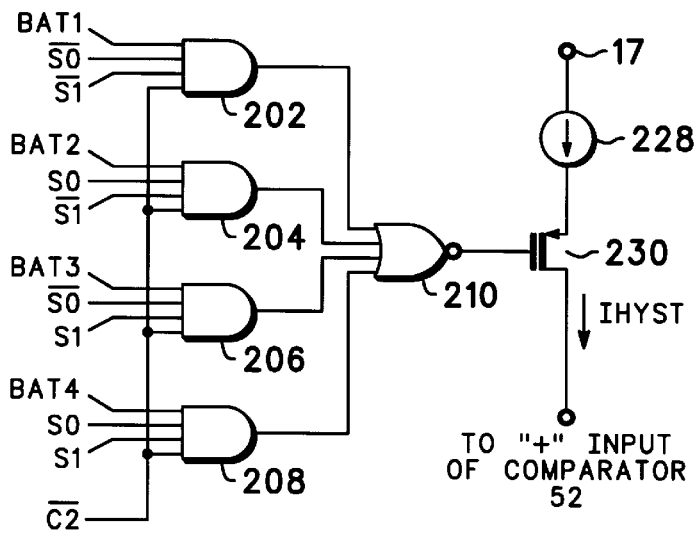
FIG. 7
200
| ENABLE | C2 | C1 | C0 | S0 | S1 | OV CLK | UV CLK | CELL MEASUREMENT |
|---|---|---|---|---|---|---|---|---|
| 1 | 0 | 0 | 0 | 0 | 0 | ⊓⊔ | 0 | OV12 |
| 1 | 0 | 0 | 1 | 1 | 0 | ⊓⊔ | 0 | OV14 |
| 1 | 0 | 1 | 0 | 0 | 1 | ⊓⊔ | 0 | OV16 |
| 1 | 0 | 1 | 1 | 1 | 1 | ⊓⊔ | 0 | OV18 |
| 1 | 1 | 0 | 0 | 0 | 0 | 0 | ⊓⊔ | UV12 |
| 1 | 1 | 0 | 1 | 0 | 1 | 0 | ⊓⊔ | UV14 |
| 1 | 1 | 1 | 0 | 1 | 0 | 0 | ⊓⊔ | UV16 |
| 1 | 1 | 1 | 1 | 1 | 1 | 0 | ⊓⊔ | UV18 |
| 0 | – | – | – | – | – | 0 | 0 | NONE |
FIG. 8
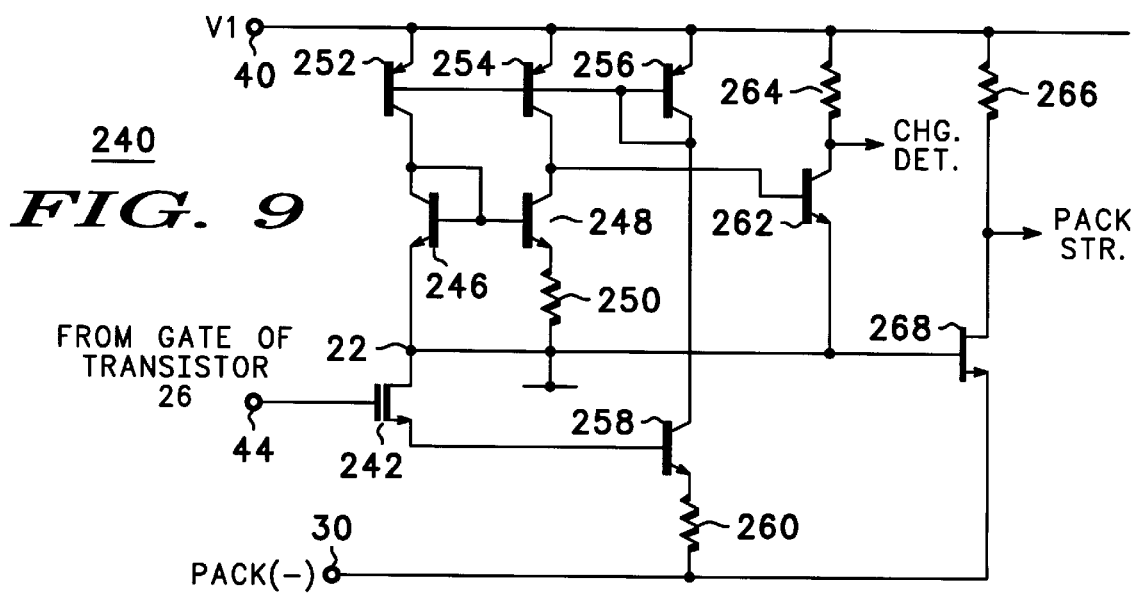
FIG. 9
240

| BATTERY CELL PACK CONDITION | | CHARGE FET 26 | DISCHARGE FET 24 | PACK SENSE | CLOCK | NODE 43 | CHARGE BALANCING |
|---|---|---|---|---|---|---|---|
| BATTERY IN CHARGER | CELL(S)UV | ON | OFF | OFF | OFF | HIGH | OFF |
| | CELL(S)NORMAL | ON | ON | ON | ON | HIGH | OFF |
| | CELL(S)OV | OFF | ON | ON | ON | LOW | ON IF UNBALANCED |
| BATTERY OUT OF CHARGER | CELL(S)UV | ON | OFF | OFF | OFF | HIGH | OFF |
| | CELL(S)NORMAL | ON | ON | OFF | ON | HIGH | OFF |
| | CELL(S)OV | OFF | ON | OFF | ON | LOW | ON IF UNBALANCED |
| OVERCHARGE CURRENT (NORMAL CELLS) | | ON, THEN OFF IF Ic(t)>3 SEC | ON | | ON | LOW | OFF |
| OVERDISCHARGE CURRENT (NORMAL CELLS) | | ON | OFF IF Id(t)>20 mSEC | | | HIGH | OFF |

*FIG. 14*

CIRCUIT AND METHOD FOR BATTERY CHARGE CONTROL

This application is a continuation of prior application Ser. No. 08/398,255, filed on Mar. 3, 1995 now abandoned.

BACKGROUND OF THE INVENTION

The present invention relates in general to battery cell monitoring and charging and, more particularly, to battery cell charge balancing.

Batteries are used in a wide variety of applications including digital pagers, cellular telephones, notebook computers, and in general, portable consumer electronics. Batteries employed in portable electronics include lithium ion, lithium polymer, nickel-cadmium, or nickel-metal hydride compositions. Since many of the applications require potentials of 12.0 volts or greater, multiple battery cells are often serially connected in a battery pack to provide the required operating potential. Once the batteries have been discharged by shelf life or during normal use in an application, it becomes necessary to recharge the battery pack. Problems of overcharging and undercharging of cells are encountered when battery packs are exposed to the recharging process. Overcharging of cells results in potentially dangerous and catastrophic failures in lithium based chemistries while over-discharged cells experience decreased cell life for all battery chemistries.

In the prior art, battery monitoring and charging schemes have been developed that continuously monitor all battery cells simultaneously within a battery pack to monitor their status and likewise, charge all cells within the battery pack in a serial fashion. A voltage differential may develop over a history of many charging cycles if cells in the battery pack are not evenly matched. Thus, when the charging process is enabled, a more severe overcharge is created for one cell with respect to the other cells causing a safety concern in the overcharged cell.

Hence a need exists to monitor and charge the individual cells of a battery pack in a balanced fashion, without undue drain on the battery pack.

BRIEF DESCRIPTION OF THE DRAWINGS

FIG. 2 is a schematic diagram illustrating the over-voltage logic of FIG. 1;

FIG. 3 is a schematic diagram illustrating the under-voltage logic of FIG. 1;

FIG. 7 is a schematic diagram illustrating the hysteresis circuit of the control circuit of FIG. 1;

FIG. 8 is a table illustrating the logical operation of the battery charging circuit of FIG. 1;

FIG. 9 is a schematic diagram illustrating the pack sense circuit of FIG. 1;

FIG. 14 is a table illustrating the functions of the battery charging circuit of FIG. 1.

DETAILED DESCRIPTION OF THE PREFERRED EMBODIMENT

Figure 1:
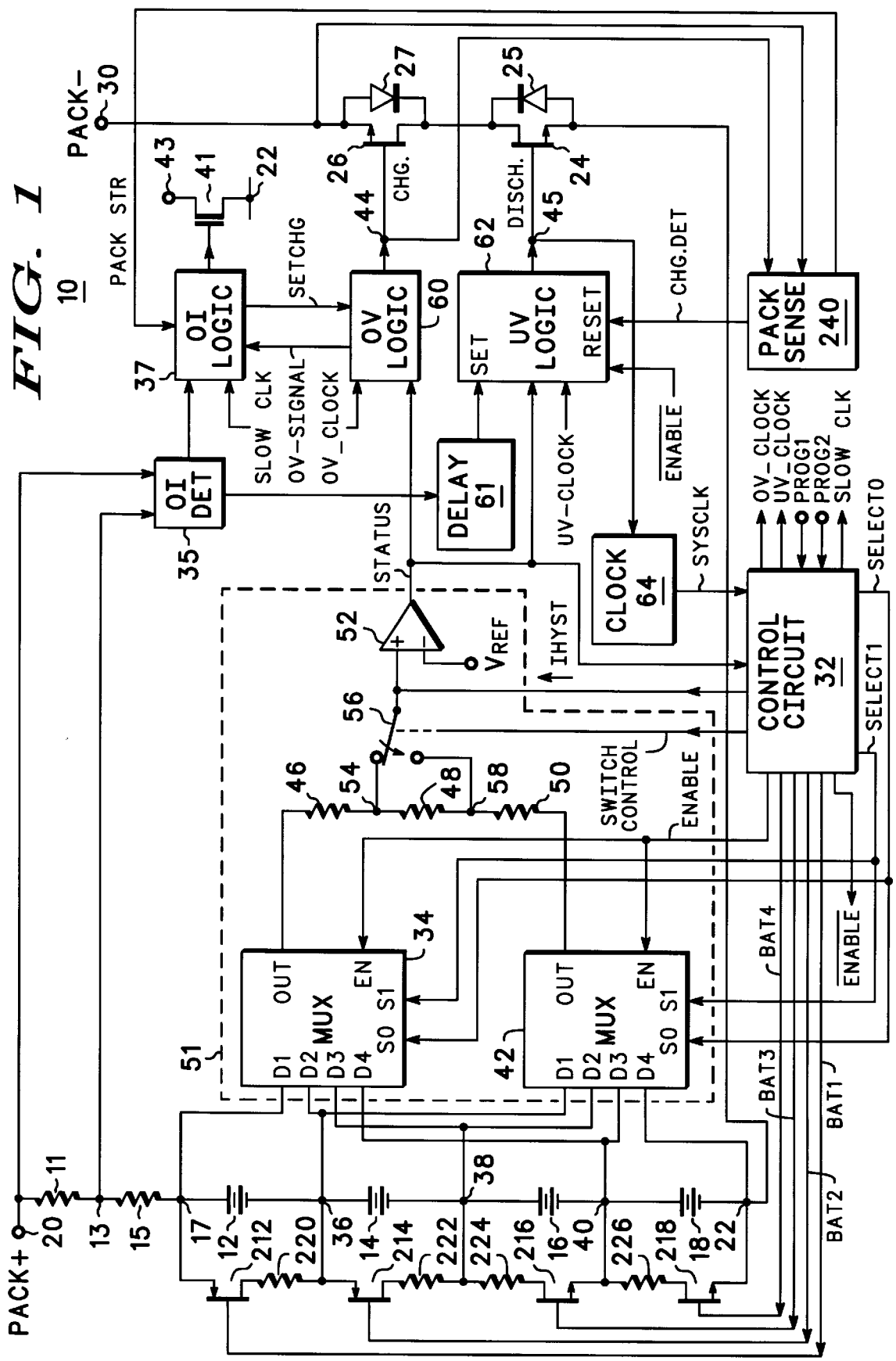
FIG. 1 is a schematic and block diagram illustrating a battery charging circuit for a battery pack.

Referring to FIG. 1, battery charge control circuit 10 is shown suitable for manufacturing as a monolithic integrated circuit (IC) using conventional integrated circuit processes. Battery cells 12, 14, 16 and 18 are serially coupled between power supply conductor 20 (PACK+) and node 22 power supply conductor. Battery cells 12, 14, 16 and 18 are preferably lithium ion or polymer type rechargeable batteries, where the lithium ion cells operate at 4.2 volts and the polymer cells operate at 3.0 volts under a full charge. PROG1 and PROG2 inputs to control circuit 32 provide for a binary programming code representing the total number of battery cells presented to battery charge control circuit 10. A list of binary programming codes for up to four battery cells is shown in Table 1. If fewer than four battery cells are present in the battery pack, the cells are replaced with a short circuit. For example, if three cells are programmed, battery cell 12 is replaced with a short circuit. Additional PROG inputs are incorporated to accommodate a battery system having more than four cells.

TABLE 1

| Number of cells | PROG1 Input | PROG2 Input |
| --- | --- | --- |
| 4 | 0 | 0 |
| 3 | 1 | 1 |
| 2 | 1 | 0 |
| 1 | 0 | 1 |

Current sense resistor 11 and current sense resistor 15 are serially coupled between power supply conductor 20 and battery cell 12. Node 22 is coupled to the source of discharge transistor 24. The drain of transistor 24 is coupled to the drain of charge transistor 26. The source of transistor 26 is coupled to power supply conductor 30 (PACK−). Diode 25 has an anode coupled to the source of transistor 24 and a cathode coupled to the drain of transistor 24. Diode 25 is inherent in the structure of transistor 24. Diode 27 has an anode coupled to the source of transistor 26, and a cathode coupled to the drain of transistor 26. Diode 27 is inherent in the structure of transistor 24. Power supply conductors 20 and 30 represent the positive and negative terminals of the battery pack formed by battery cells 12–18. Transistor 24 receives a DISCHARGE (DISCH) signal at node 45 from the output of under-voltage logic (UV logic) circuit 62. The gate of transistor 26 is coupled to the output of OV logic circuit 60, at node 44, to receive a CHARGE (CHG) signal. An input of OV logic circuit 60 is coupled to receive the SET CHARGE (SET CHG) signal from an output of over-current logic (OI logic) circuit 37. Transistor 41 has a drain coupled to node 22, a gate coupled to an output of over-current logic circuit 37, and a source coupled to a terminal 43 for connection to an external resistor located within a battery charger. Transistor 41 could also be a bipolar transistor. OI logic circuit 37 receives a signal from the output of over-current detect circuit (OI detect) 35, the SLOW CLOCK signal from control circuit 32, and the OV signal from OV logic circuit 60.

Transistor 41 of OI logic circuit 37 simulates the behavior of a thermistor. Nickel technology based battery chargers have a terminal that is used for a thermistor connection. As an advantage of the present invention, when a lithium technology battery pack is coupled to a nickel technology battery charger, transistor 41 is activated, causing the battery charger to operate in a trickle current charge mode. The thermistor simulation device disables the large value nickel technology charging currents that normally are applied to the battery pack. The lithium technology battery pack is therefore protected from dangerous overcharging.

The inputs of OI DETECT circuit 35 are coupled across sense resistor 11. OI DETECT circuit 35 has a second output coupled to the SET input of UV logic 62 through delay circuit 61. When an over-discharge current is detected by OI DETECT circuit 35, representing a short circuit at the battery pack terminals, the SET input of UV logic 62 is activated to disconnect the cells from the current path. Delay circuit 61 includes two flip-flops (not shown) coupled in series to provide the desired delay. Delay circuit 61 could also be made from a chain of gates coupled in series. Delay circuit 61 provides a 20.0 millisecond delay of the IO detect 35 output signal to compensate for connecting the battery pack to a capacitive load.

The DISCHARGE and CHARGE signals, at the gates of transistors 24 and 26, respectively, enable and disable the conduction path between power supply conductors 20 and 30. If the battery charge control circuit described hereinafter determines that an over-voltage condition or under-voltage condition exists on any individual battery cell, then transistor 24 and/or transistor 26 disables the conduction path between power supply conductors 20 and 30. Transistors 24 and 26 are placed as external components or are integrated into the IC containing battery charge control circuit 10.

Cell measurement circuit 51 includes multiplexers 34 and 42, resistors 46, 48 and 50, switching circuit 56 and comparator 52. Analog multiplexer 34 has a first data input D1 coupled to power supply conductor 20 and a second data input D2 coupled to node 36 at the interconnection between battery cells 12 and 14. Multiplexer 34 further includes a third data input D3 coupled to node 38 at the interconnection between battery cells 14 and 16, and a fourth data input D4 coupled to node 40 at the interconnection of battery cells 16 and 18. Analog multiplexer 42 has four data inputs D1–D4 also coupled to nodes 36, 38, 40 and 22, respectively.

Multiplexers 34 and 42 receive control signals SELECT1, SELECT0, and ENABLE (EN) from the outputs of control circuit 32, respectively. The output of multiplexer 34 is coupled to one side of serially coupled resistors 46, 48 and 50. The output of multiplexer 42 is coupled to the opposite side of the serially coupled resistors 46, 48 and 50. Comparator circuit 52 has a non-inverting input terminal coupled by way of switch 56 to either the interconnection of resistors 46 and 48 at node 54 or to the interconnection of resistors 48 and 50 at node 58. Control circuit 32 controls switch 56 with the SWITCH control signal. The inverting input terminal of comparator 52 receives a reference potential $V_{REF}$ operating at 1.25 volts. The STATUS signal output of comparator 52 is coupled to inputs of over-voltage logic 60, under-voltage logic 62, and to control circuit 32. The output of under-voltage logic 62 also provides an input to clock 64 for enabling a system clock signal output (SYSCLK) from clock circuit 64 that is coupled to an input of control circuit 32. Over-voltage logic 60 and under-voltage logic 62 receive signals OV_CLOCK and UV_CLOCK, respectively, from control circuit 32. Control circuit 32 also provides a hysteresis current (IHYST) coupled between the non-inverting input of comparator 52 and switch 56.

Discharge transistors 212 and 214 are coupled across battery cells 12 and 14, respectively. The drain of transistor 212 is further coupled through resistor 220 to node 36, and the drain of transistor 214 is further coupled through resistor 222 to node 38. Discharge transistors 216 and 218 are coupled across battery cells 16 and 18, respectively. The drain of transistor 216 is coupled through resistor 224 to node 38, and the drain of transistor 218 is coupled through resistor 226 to node 40. The gates of transistors 212, 214, 216 and 218 receive battery control signals BAT1, BAT2, BAT3 and BAT4, respectively, from control circuit 32.

Pack sense circuit 240 has a first input coupled to power supply conductor 30, a second input coupled to node 44, a first output providing a CHARGE DETECT (CHG DET) signal coupled to a reset of under-voltage logic 62, and a second output for providing a PACK STRETCH (PACK STR) signal to an input of over-current logic circuit 37.

The operation of battery charge control circuit 10 proceeds as follows. When the battery pack becomes discharged due to self-discharge of the battery cells or usage in a system, it is necessary to re-charge battery cells 12, 14, 16 and 18. An external power source, e.g. battery charger, is coupled to power supply conductors 20 and 30 and a re-charge current is pumped into battery cells 12, 14, 16 and 18. Characteristically, a battery pack inserted in a battery charger contains individual battery cells exhibiting a mixed state of charge, i.e., one battery cell is in an acceptable charged state, another battery cell is in an overcharged state, while another battery cell is in an undercharged state, or any combination of the above. As an advantage of the present invention, battery charge control circuit 10, balances the charge within the battery cells of the cell pack to enhance battery pack lifetime and safety.

Battery charge control circuit 10 sequentially samples the voltage across each battery cell and identifies when the battery cells reach an unbalanced condition during charging. A battery cell is in balance with another battery cell if the first battery cell is within the hysteresis voltage VHYST of the other cells in the battery pack. Battery charge control circuit 10 uses the over-voltage limit set by comparator 52 and resistors 46, 48 and 50 as the criteria for balancing. If, in the case of charging the battery pack, one or more battery cells is sampled at an over-voltage by comparator 52, the measurement is transferred into control circuit 32. If all battery cells 12, 14, 16 and 18 in the battery pack are measured as over-voltage, the battery pack is considered balanced. If less than all cells are over-voltage at the same time, the over-voltage cells are discharged by battery charge control circuit 10 to bring the over-voltage cells in balance with the remainder of the battery cells.

Control signals SELECT0 and SELECT1, controlling multiplexers, 34 and 42 cycle between selecting data inputs D1, D2, D3 and D4 of each multiplexer to sequentially sample battery cells 12, 14, 16 and 18. In one state the control signals SELECT0 and SELECT1 select the D1 input of multiplexer 34 to pass the voltage at power supply conductor 20 to the top side of resistor 46. Simultaneously, the control signals SELECT0 and SELECT1 enable the D1 input of multiplexer 42 to pass the voltage at node 36 to the bottom side of resistor 50. Thus, the voltage across battery cell 12 appears across serial resistors 46, 48 and 50. During the status check of battery cell 12, control circuit 32 further controls switch 56 to connect node 58 to the non-inverting input of comparator 52 to check for an over-voltage fault. The voltage at node 58 is a resistor divider ratio of the value of resistor 50 divided by the sum of resistors 46, 48 and 50. The value of resistors 46 is selected at 102.25 Kohms, and resistor 48 is set to 30.55 Kohms, while resistor 50 is set to 55.0 Kohms. The values chosen for the resistors can be adjusted for varying battery cell technologies. Resistors 46, 48, and 50 can also be selected to be placed external to the integrated circuit. If the voltage at node 58 exceeds the reference voltage $V_{REF}$, then the output of comparator 52 goes high indicating an over-voltage fault. If the voltage at node 58 is less than the reference voltage $V_{REF}$ then the output of comparator 52 remains low and battery cell 12 is not overcharged.

The over-voltage ($V_{OV}$) voltage limit is determined as shown in equation (2).

$$V_{OV} = V_{REF} \times \frac{R50}{R50 + R48 + R46} \qquad (2)$$

With switch 56 still set to check over-voltage, the control signals SELECT0 and SELECT1 select the D2 inputs of multiplexers 34 and 42 to pass the voltage at node 36 to the top side of resistor 46 and the voltage at node 38 to the bottom side of resistor 50. Comparator 52 performs an over-voltage check of battery cell 14 as described above. The process repeats to select the D3 inputs of multiplexers 34 and 42 to pass the voltage at node 38 to the top side of resistor 46 and the voltage at node 40 to the bottom side of resistor 50. Comparator 52 performs an over-voltage check of battery cell 16. The control signals SELECT0 and SELECT1 finally select the D4 inputs of multiplexers 34 and 42 to pass the voltage at node 40 to the top side of resistor 46 and the voltage at node 22 to the bottom side of resistor 50. Comparator 52 performs an over-voltage check of battery cell 18. If fewer than four cells are programmed by the PROG1 and PROG2 inputs, the non-selected, shorted cells are not sampled by multiplexers 34 and 42.

As battery charge control circuit 10 detects an over-voltage, i.e. overcharge, condition in one battery cell, it initiates a discharge function for that battery cell immediately after comparing it to the condition of the other battery cells. The discharge function operates as follows. If the battery pack has been placed in a compatible charger, and if one battery cell is determined to be in an over-voltage condition, charge transistor 26 is "off" and discharge transistor 24 is "on". Clock 64 continues to run and the battery balancing mode is enabled. If battery cell 12 is in the over-voltage condition while battery cells 14, 16 and 18 are not in an over-voltage condition, the STATUS input of control circuit 32 activates BAT4 control circuit output immediately after comparing it to the condition of the other battery cells. BAT4 signal turns "on" transistor 212, i.e. the discharge circuit, causing battery cell 12 to discharge at a rate limited by the "on" voltage combination of transistor 212 in series with the resistor 220.

Battery cell 12 continues to be measured until the battery voltage is discharged to a predetermined level. The predetermined level is established by passing a hysteresis current IHYST into the resistor network comprising resistors 46, 48 and 50, beginning on the second sampling cycle. The voltage VHYST generated by inserting IHYST between resistors 46, 48 and 50, artificially elevates the voltage at node 54. During the second sampling cycle, the voltage presented at the non-inverting input of comparator 52 is equal to the actual voltage across the battery cell plus the voltage created by IHYST passing through the parallel combination of resistors 46, 48 and 50. Thus, the battery cell continues to discharge on successive cycles until its voltage reaches the over-voltage limit, set at the non-inverting input of comparator 52, minus the voltage drop created by IHYST. IHYST, as shown in FIG. 1, is 1.40 microamps. VHYST can be adjusted to give a desired over-voltage threshold hysteresis, dependent upon resistors 46, 48 and 50.

VHYST is determined as shown in equation (3).

$$VHYST = IHYST \times [R50 \| (R48 + R46)] \qquad (3)$$

Battery cells with potentials of less than $V_{OV}$ are permitted to charge, only after all over-voltage battery cells have been discharged to a voltage of $V_{OV}$ minus VHYST. Once each battery cell has been serially sampled for over-voltage, the control signals SELECT0 and SELECT1 cycle back to select the D1 inputs of multiplexers 34 and 42. Switch 56 switches to connect node 54 to the non-inverting input of comparator 52 to check for an under-voltage fault. Voltage at node 54 is the voltage across battery cell 12 reduced by the resistor divider ratio of resistor 48 plus resistor 50 divided by resistors 46, 48 and 50. If the voltage at node 54 is less than the reference voltage $V_{REF}$, then the output of comparator 52 goes low indicating an under-voltage fault. Alternately if the voltage at node 54 is greater than the reference voltage $V_{REF}$ then the output of comparator 52 remains high indicating proper operation for battery cell 12. The process of checking under-voltage repeats for battery cells 14, 16 and 18 as the SELECT0 and SELECT1 control signals cycle through selecting the D2–D4 multiplexer inputs.

STATUS output signal, from comparator 52, indicating an under-voltage battery cell, is clocked into UV logic circuit 62 with a UV_Clock signal. UV logic circuit 62 turns off discharge transistor 24. The output of UV logic circuit 62 also controls SYSCLK through clock circuit 64. If an under-voltage cell is measured by comparator 52, clock circuit 64 is disabled by UV logic circuit 62, forcing battery charge control circuit 10 to operate in a low current sleep mode. Charge transistor 26 is maintained in an ON state through the action of OV logic circuit 60. The back gate of discharge transistor 24 is used to complete the charging path through the battery pack, through charge transistor 26, to power supply conductor PACK–. If pack sense circuit 240 senses a current in the backgate of transistor 24, UV logic circuit 62 is reset and clock circuit 64 is enabled.

Under-voltage battery cells are charged until the battery cells reach the potential set by $V_{OV}$. The acceptable voltage range per cell for lithium ion batteries is 2.5 volts to 4.2 volts. The acceptable voltage range per cell for lithium polymer batteries is 1.8 volts to 3.00 volts.

The under-voltage $V_{UV}$ voltage limit is determined as shown in equation (4).

$$V_{UV} = V_{REF} \times \frac{R50 + R48}{R50 + R48 + R46} \qquad (4)$$

In an alternate embodiment, the process may sample for both over-voltage and under-voltage on each battery cell before moving on to the next battery cell. One important aspect of the present invention is the serial sampling of each battery cell for over-voltage and under-voltage. By now it can be appreciated that battery charge control circuit 10 checks one battery cell at a time to insure proper safety and optimum operating life conditions for each cell in the battery pack.

Another potential problem is an under-voltage condition on any one battery cell occurring when the battery pack is disconnected from a battery charger. The under-voltage must be detected so that the battery pack can be disabled to prevent over-discharge of the under-voltage battery cell. Once each battery cell has been serially sampled for over-voltage, the battery pack is then sampled for under-voltage battery cells. If an under-voltage battery cell is detected at the output of comparator 52, the STATUS signal is clocked into UV logic circuit 62. UV logic circuit 62 pulls node 45 to a logic zero, thus turning off discharge transistor 24 and further disabling clock 64. The SYSCLK output is resultingly disabled, powering down control circuit 32. The logic zero at node 45 also disables charge pump circuitry (not shown) associated with UV logic 62 and OV logic 60. Although the charge pump circuitry is powered down, a large capacitor is placed at the output of the charge pump to maintain power to the logic circuitry driven by the charge pump. The capacitor is chosen such that the circuit data is valid for a predetermined period of time.

Thus, as an advantage of the present invention, undervoltage battery cell capacity is not deteriorated by the action of battery cell charging circuit 10.

In another embodiment of the present invention, it is important to determine when a battery pack is placed within a battery charger. Additionally, it is important that the battery charger is compatible with the battery cell technology used in the battery pack. If a lithium ion battery pack is placed in a battery charger that was designed to charge a nickel-cadmium battery pack, the high charge rate of the nickel-cadmium charger could prove destructive to the lithium ion battery pack. Referring again to FIG. 1, over-current detect circuit 35 and over-current logic circuit 37 are shown. Current sense resistor 11 is designed such that the voltage drop across resistor 11 is a maximum of 16.0 millivolts when battery charge control circuit 10 is placed in a lithium ion battery charger. The terminal contacts for the battery charger are power supply conductor 20 (PACK+) and power supply conductor 30 (PACK-).

Over-current detector 35 can be in the form of a current mirror (FIG. 10) with resistor 11 used to sample the charging or discharging current. Mirrored currents provide a logic level output that is compatible with the input of over-current logic circuit 37. Likewise, a second output of over-current detector 35 is directed toward the SET input of undervoltage logic circuit 62. The SET input causes the gate of discharge transistor 24 to be pulled low to interrupt the current path during conditions where the battery pack is short circuited. Alternatively, over-current detector 35 can be of the form of a voltage comparator (not shown).

During battery cell charging over-current detector 35 senses the voltage drop across current sense resistor 11. If the voltage drop exceeds 16.0 millivolts, an over-current charging condition is indicated, and a logic one signal is sent to the input to over-current logic circuit 37. A resulting driving signal logic one signal is fed from the output of over-current logic circuit 37 to the gate of transistor 41. Transistor 41 turns on and causes an external pullup resistor (not shown) housed within a battery charger (not shown) to view the lithium technology battery pack as a fully charged nickel technology battery pack. In nickel technology battery cells, a thermistor is often included in the cell and is used for charge termination by pulling the thermistor output low. A low thermistor output causes the charging current, in a nickel technology battery, to be reduced. The reduced charging current level is more acceptable to a lithium cell placed in a nickel type charger. Over-current logic circuit 37 waits three seconds for the battery charger to respond to the turn-on of transistor 41. If the battery charger decreases the current flowing into power supply conductor 20 to a level such that the voltage drop across current sense resistor 11 is less than 16.0 millivolts, charge transistor 26 remains in an "ON" state. Charge transistor 26 thus allows the battery pack to charge with the reduced trickle charge current. If after three seconds, the voltage drop across current sense resistor 11 is greater than 16.0 millivolts, over-current logic 37 outputs a logic one, SET CHG signal, causing node 44 to be driven to a logic zero, turning-off charge transistor 26. The charging of the battery pack is thus suspended.

Turning to FIG. 2, further detail of over-voltage logic circuit 60 is shown including flip-flop 70 having a data input coupled for receiving the STATUS signal from the output of comparator 52. OR gate 72 has a first input receiving an OV CLOCK signal and a second input coupled to the Q-output of flip-flop 70. Flip-flop 70 is reset by a logic zero START control signal at its reset input. The Q-output of flip-flop 70 is further coupled to the data input of flip-flop 74 which is clocked by an enable control signal. The Q-output of flip-flop 74 provides the OV signal output signal and is coupled to an input of NOR gate 39. NOR gate 39 has a second input coupled for receiving the SET CHG signal from OI logic circuit 37. The output of NOR gate 39 is coupled to the gate of transistor 78 and to the input of inverter 75. The output of inverter 75 is coupled to the gate of transistor 76. The sources of transistors 76 and 78 are coupled to node 22 operating at ground potential. The drain of transistor 76 is coupled to the drain of transistor 80 at node 82. The drain of transistor 78 is coupled to the drain of transistor 84 at node 86. The gates of transistors 80 and 84 are coupled to nodes 86 and 82, respectively. The sources of transistors 80 and 84 are coupled to an output of charge pump 88. Charge pump 88 receives an input voltage ranging from 3.6 to 8.4 volts from node 38 and provides an output voltage VPUMP operating between 10.0 to 12.0 volts. The gate of transistor 90 is coupled to node 82, while the gate of transistor 92 is coupled to node 86. The sources of transistors 90 and 92 receive the VPUMP voltage from charge pump 88. The drain of transistor 90 is coupled to the drain of transistor 94 and to the gate of transistor 96. The drain of transistor 92 is coupled to the gate of transistor 94 and to the drain of transistor 96. The sources of transistors 94 and 96 are coupled to power supply conductor 30. The interconnection of the drains of transistors 92 and 96 provide the CHARGE control signal to the gate of transistor 26.

The operation of over-voltage logic circuit 60 proceeds as follows. The START control signal resets flip-flop 70. The START control signal is the C12 bit from counter 116 of FIG. 4. Assuming the STATUS signal from comparator 52 is a logic one indicating an over-voltage fault, an OV_CLOCK signal latches the logic one at the Q-output of flip-flop 70. The output of OR gate 72 goes to logic one and disables further OV_CLOCK signals into flip-flop 70. An over-voltage condition on any one cell is thus latched at the Q-output of flip-flop 70 to prevent any further status checks of subsequent battery cells from overriding the over-voltage condition already detected. The ENABLE control signal from control circuit 32 latches the logic one from the Q-output of flip-flop 70 into flip-flop 74. The ENABLE control signal is asserted after the over-voltage check of each battery cell 12–18. The logic one at the Q-output of flip-flop 74 forces the output of NOR gate 39 to a logic zero, causing the gate of transistor 78 to be pulled low. Transistor 78 turns off, allowing node 86 to go high. The logic zero at the output of NOR gate 39 is inverted at the output of inverter 75, causing the gate of transistor 76 to be pulled to a logic one. Transistor 76 turns on and pulls node 82 low to turn on transistor 84 and pull node 86 high. The logic zero at the $\overline{Q}$-output of flip-flop 74 turns off transistor 78 allowing node 86 to go high. Transistor 80 is off because of the high signal at node 86. The low voltage at node 82 turns on transistor 90 and pulls the gate of transistor 96 high toward the VPUMP voltage. Transistor 96 turns on and pulls the CHARGE control signal low. Transistor 92 is off because of the high voltage at node 86. Transistors 94 and 26 turn off with the low CHARGE control signal. Thus, the detected over-voltage condition causes transistor 26 to become non-conductive thereby breaking the conduction path between power supply conductors 20 and 30 and interrupting charge to battery cells 12–18.

Alternately, a logic zero STATUS signal latched at the Q-output of transistor 70 indicates a valid status check of the battery cell. The logic zero is latched into flip-flop 74 when the ENABLE control signal is asserted at the completion of each cycle through the battery cells. If an over-current condition has not been detected by OI logic circuit 37, the SET CHG signal is at a logic zero level. The logic zero at the Q-output of flip-flop 74 and the logic zero SET CHG signal force the output of NOR gate 39 to a logic one turning on transistor 78 and pulling node 86 low to turn on transistors 80 and 92. The logic one at the output of NOR gate 39 is inverted to a logic zero at the output of inverter 77, turning off transistor 76 and allowing node 82 to go high thereby turning off transistors 84 and 90. The CHARGE control signal goes high to turn on transistor 94 and in turn disable transistor 96. The high CHARGE control signal also enables transistor 26 and the conduction path between power supply conductors 20 and 30 to allow charging of battery cells 12–18.

In the case where OI DETECT circuit 35 has detected an over-current condition in sense resistor 11 and the charger does not respond to the logic zero level at node 43, of transistor 41, the SET CHG signal is forced to a logic one, and causes the output of NOR gate 39 to a logic zero state. The CHARGE signal to the gate of transistor 26 is thus disabled, interrupting the conduction path between power supply conductors 20 and 30 and interrupting charge current to battery cells 12–18.

In FIG. 3, under-voltage logic circuit 62 is shown including flip-flop 100 having a data input receiving the STATUS output signal from comparator 52 inverted by inverter 102. OR gate 104 has a first input receiving an UV_CLOCK signal and a second input coupled to the Q-output of flip-flop 100. Flip-flop 100 is reset by a logic zero CHG DET applied to its reset input from pack sense 240. The Q-output of flip-flop 100 is further coupled to the DATA input of flip-flop 101. The SET input of flip-flop 101 receives an over-discharge current detect signal from over-current detect circuit 35. Flip-flop 101 receives the $\overline{\text{ENABLE}}$ signal from control circuit 32 at its clock input. The Q-output of flip-flop 101 is coupled to the gate of transistor 108, while the $\overline{\text{Q}}$-output of flip-flop 101 is coupled to the gate of transistor 110. The sources of transistors 108 and 110 are coupled to node 22. The drain of transistor 108 is coupled to the drain of transistor 112 and to the gate of transistor 114 and to the gate of transistor 24. Transistors 108 and 112 control the DISCHARGE control signal. The drain of transistor 110 is coupled to the drain of transistor 114 and to the gate of transistor 112. The sources of transistors 112 and 114 receive the VPUMP voltage from charge pump 88.

The operation of under-voltage logic circuit 62 proceeds as follows. A logic zero STATUS signal at the output of comparator 52 indicates a sampled under-voltage condition for the battery cell. The logic zero is inverted by inverter 102 and latched into flip-flop 100 as a logic one during the next UV_CLOCK signal. The logic one at the Q-output of flip-flop 100 produces a logic one at the output of OR gate 104 and disables further UV_CLOCK signals from reaching flip-flop 100. The logic one at the Q-output of flip-flop 100 propagates to the Q-output of flip-flop 101 upon application of a logic one $\overline{\text{ENABLE}}$ clock signal from control circuit 32. The logic one $\overline{\text{ENABLE}}$ signal occurs after all battery cells 12, 14, 16 and 18 have been sampled for an under-voltage condition. The logic one from the Q-output of flip-flop 101 turns on transistor 108 and pulls the DISCHARGE control signal low to turn on transistor 114. Transistor 112 is off with a high signal at the drain of transistor 114. Thus, a detected under-voltage condition sets the DISCHARGE control signal low and turns off transistor 24 to break the conduction path between power supply conductors 20 and 30 and isolates battery cells 12–18 from the external system.

Alternately, a logic one STATUS signal at the output of comparator 52 following a sampling sequence latches a logic zero at the Q-output of flip-flop 100. The logic zero at the Q-output of flip-flop 100 propagates to the Q-output of flip-flop 101 upon application of a logic one $\overline{\text{ENABLE}}$ clock signal from control circuit 32. The logic one $\overline{\text{ENABLE}}$ signal occurs after all battery cells 12, 14, 16 and 18 have been sampled for an under-voltage condition. The logic zero of the Q-output of flip-flop 101 is applied to the gate of transistor 108 and causes transistor 108 to turn off. The logic one $\overline{\text{Q}}$-output of flip-flop 101 turns on transistor 110 and in turn transistor 112 to pull the DISCHARGE control signal high toward the VPUMP voltage. Transistor 114 is off with the high DISCHARGE control signal. Transistor 24 conducts to enable the conduction path between power supply conductors 20 and 30 for normal operation of the battery pack.

Referring again to FIG. 3, when the battery pack is placed in a loaded condition, an excessive discharging current detected through resistor 15 in FIG. 1 generates a logic one signal at the outputs of over-current detector circuit 35. The logic one signal is applied to the SET input of flip-flop 101, creating a logic one at the Q-output of flip-flop 101 and a logic zero at the $\overline{\text{Q}}$-output of flip-flop 101. The logic one at the Q-output of flip-flop 101 is applied to the gate of transistor 108, turning on transistor 108 and causing the gate of transistor 24 to be pulled low, turning off transistor 24 to break the conduction path between power supply conductors 20 and 30 and isolate battery cells 12–18 from the external system.

Thus, it can be appreciated that as an embodiment of the present invention, under-voltage logic circuit 62 monitors the status of the battery cells and disables discharge transistor 24 if any one battery cell is determined to be under-voltage. Discharge transistor 24 is maintained in an off state until such a time as the battery pack is placed in a battery charger, and the battery cell charging process is initiated with a battery cell compatible charging current.

Figure 4:
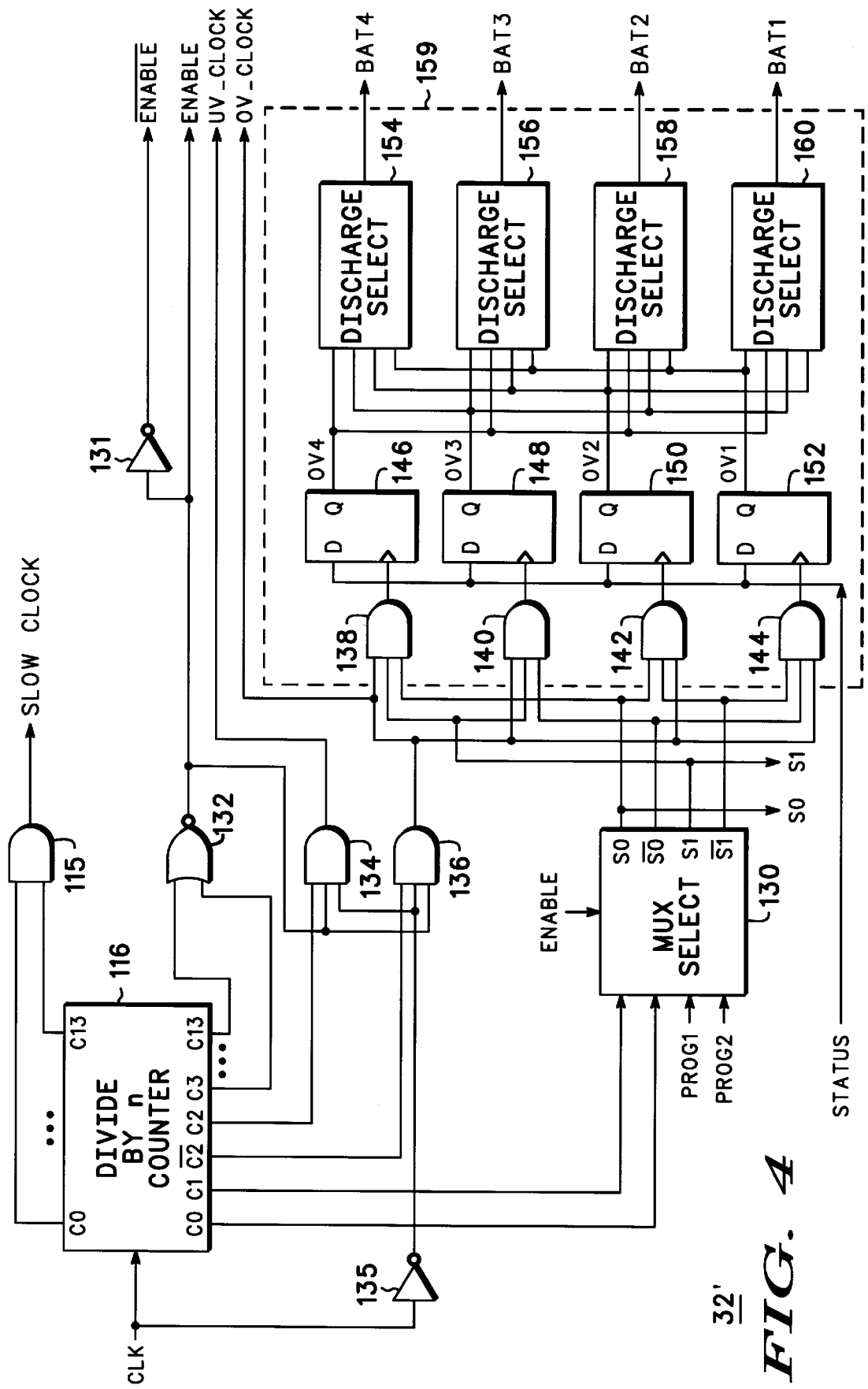
FIG. 4 is a schematic and block diagram illustrating a discharge select logic of the control circuit of FIG. 1.

Referring to FIG. 4, a portion of control circuit 32, control circuit 32A is shown. Control circuit 32A includes counter 116, MUX select 130, battery select logic 159, ENABLE signal logic, UV_CLOCK logic, and OV_CLOCK logic. Counter 116 is a 14-bit counter having a clock input for receiving a system clock SYSCLK operating at 11.0 KHz. Counter 116 includes outputs labeled C0–C13 where C0 is the least significant bit of counter 116. Outputs C3 through C13 are coupled to the inputs of NOR gate 132 to provide an ENABLE output signal. The output of NOR gate 132 is coupled to the input of inverter 131 to provide an $\overline{\text{ENABLE}}$ signal at the output of inverter 131. The $\overline{\text{ENABLE}}$ signal is coupled to an input of UV logic 62. The ENABLE signal is applied to enable inputs of multiplexers 34 and 42 of FIG. 1, clock input of D-flip-flop 74 of FIG. 2, and an input of multiplexer select 130. NAND gate 134 has a first input coupled to receive $\overline{\text{C2}}$ output of counter 116 and a second input coupled to the output of inverter 135. The input of inverter 135 receives SYSCLK. The output of NAND gate 134 provides a UV_CLOCK signal to UV logic circuit 62 of FIG. 1. NAND gate 136 has a first input coupled to output C2 from counter 116 and a second input coupled to the output of inverter 135. The output of NAND gate 136 provides the OV_CLOCK signal to battery select logic 159 and to OV logic circuit 60. Multiplexer select 130 receives C0 and C1 signals from counter 116. Multiplexer select 130 also receives PROG1 and PROG2 binary encoded signals. PROG1 and PROG2 signals are programmed by the user as shown in Table 1. Multiplexer outputs B0, $\overline{B0}$, B1 and $\overline{B1}$ provide, along with OV_CLOCK signal, the encoding for battery select logic 159. Multiplexer outputs B0, $\overline{B0}$, B1, $\overline{B1}$, and the OV_CLOCK signal are coupled through NAND gates 138, 140, 142 and 144 to flip-flops 146, 148, 150 and 160 to provide the required logic to encode battery select logic 159.

Referring again to FIG. 4, counter 116 outputs C0 through C13 are coupled to the inputs respectively of AND gate 115. The output of AND gate 115 is the SLOW CLOCK signal.

The formula for calculating the SLOW CLOCK signal period is shown in equation (1), $$\text{Period} = \frac{2^{Cn}}{fCLK} \qquad (1)$$

where fCLK is the frequency of CLK and $C_n$ is the number of bits in counter 116. For the circuit of FIG. 4, $F_{CLK}$ is 11.0 KHz and $C_n$ is 14 bits, resulting in a period of 1.5 seconds. Clock circuit 64 is an RC oscillator circuit (not shown). An RC oscillator circuit was selected because of cost and integrability factors. Other forms of clock circuits can be used as well, including crystal oscillators and ring oscillators.

The operation of the over-voltage and under-voltage decoding of FIG. 4 is shown in Table 1 of FIG. 8. Measurement OV12 refers to over-voltage check of battery cell 12, measurement OV14 refers to over-voltage check of battery cell 14, and so on. Measurement UV12 refers to under-voltage check of battery cell 12, measurement UV14 refers to under-voltage check of battery cell 14, and so on. Counter 116 is initialized with logic zeros and counts up by way of the system clock CLK until reaching all ones at which point it wraps around to all zeros. In FIG. 8, C0, C1, and C2 represent the three least significant bits of counter 116. ENABLE is an output signal from control circuit 32. S0 and S1 are the logic inputs to multiplexers 34 and 42 that are used to decode the selection of the cell measurements. For example, S0=0 and S1=0 indicates a cell measurement for OV12. OV_CLK and UV_CLK are the over-voltage and under-voltage clock signals emanating from control circuit 32.

Figure 5:
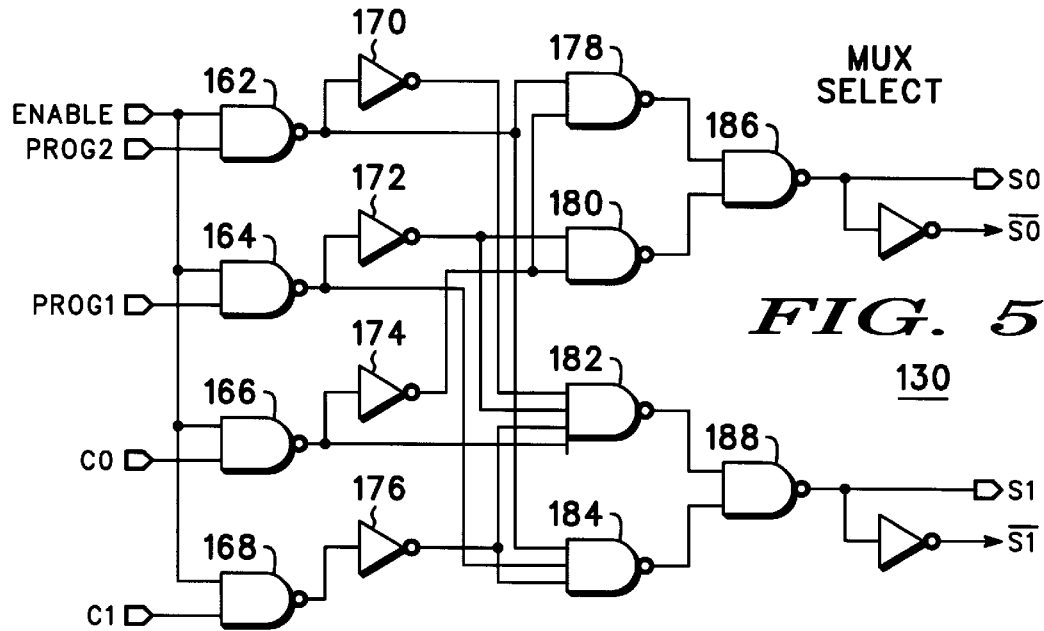
FIG. 5 is a schematic diagram illustrating a multiplexer select logic of the control circuit of FIG. 1.

Referring to FIG. 5, the logic for MUX select circuit 130 of control circuit 32 is shown. NAND gates 162, 164, 166 and 168 are coupled for receiving signals PROG1, PROG2, C0 and C1, respectively. The ENABLE signal is received concurrently by a second input of each of NAND gates 162, 164, 166 and 168. MUX select 130 encodes the received signals and provides output signals SELECT0, $\overline{\text{SELECT0}}$, SELECT 1 and $\overline{\text{SELECT1}}$. Multiplexers 34 and 42 receive the SELECT 0, $\overline{\text{SELECT0}}$, SELECT 1 and $\overline{\text{SELECT1}}$ signals at S0 and S1 inputs. The signals S0 and S1 are decoded, as described in FIG. 8 below, to select a particular battery cell for an over-voltage or under-voltage measurement.

Figure 6:
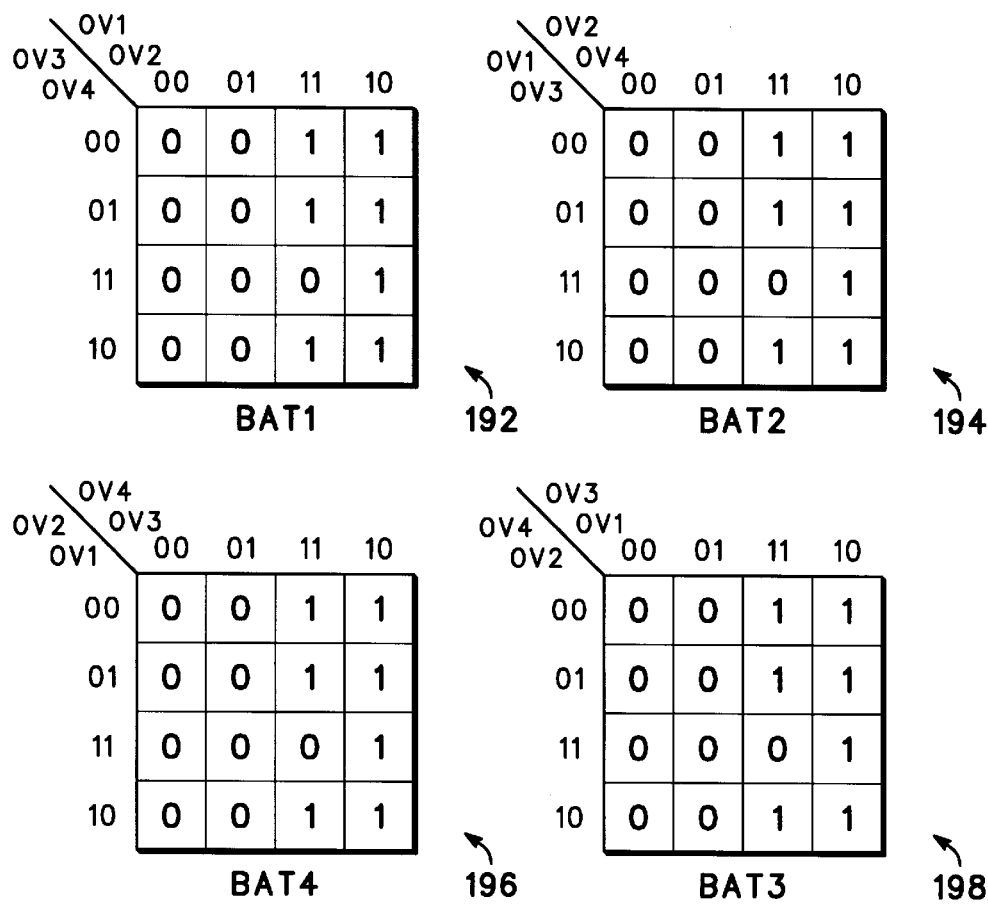
FIG. 6 is a set of logic tables illustrating the logic function of the discharge select blocks of FIG. 5.

Referring now to FIG. 6, decode logic Karnaugh maps 190 for discharge select circuits 154, 156, 158 and 160 are shown. Karnaugh maps 190 refer to a four cell battery pack. BAT1 192, BAT2 194, BAT3 198 and BAT4 196 are the logical output representations of the logical inputs OV1, OV2, OV3 and OV4, respectively, of discharge select circuits 160, 158, 156 and 154 of FIG. 4, respectively. By reviewing decode logic Karnaugh maps 190, logic circuits are implemented to produce the desired BAT1, BAT2, BAT3, and BAT4 signals. Logic Karnaugh maps 190 are used to provide decode signals to discharge over-voltage battery cells when other cells are not in an over-voltage condition to bring the over-voltage cells into a balanced condition.

Looking to FIG. 7, hysteresis circuit 200 is shown. Hysteresis circuit 200 is contained within control circuit 32 of FIG. 1. NOR gate 210 has four inputs coupled to the outputs of NAND gates 202, 204, 206 and 208, respectively. NAND gate 202 has an input for receiving BAT1 signal from discharge select 160 of FIG. 4. NAND gate 202 also has inputs for receiving $\overline{S0}$ and $\overline{S1}$ signals from control circuit 32. NAND gate 204 has an input for receiving BAT2 signal from discharge select 158 of FIG. 4. NAND gate 204 also has inputs for receiving S0 and $\overline{S1}$ signals from control circuit 32. NAND gate 206 has an input for receiving BAT3 signal from discharge select 156 (of FIG. 4). NAND gate 206 also has inputs for receiving $\overline{S0}$ and S1 signals from control circuit 32. NAND gate 208 has an input for receiving BAT4 signal from discharge select 154 of FIG. 4. NAND gate 202 also has inputs for receiving S0 and S1 signals from control circuit 32. NAND gates 202, 204, 206 and 208 have inputs respectively coupled to the $\overline{C2}$ output of counter 116. The output of NOR gate 210 drives the gate of transistor 230. The source of transistor 230 is coupled through current source 228 to node 17 for receiving voltage from battery cells 12, 14, 16 and 18. Current source 228 is coupled to the node 17 so that the current source is operated free from the saturation region.

The operation of hysteresis circuit 200 proceeds as follows. BAT1, BAT2, BAT3 and BAT4 signals indicate to hysteresis circuit 200 whether the battery cell voltage that is sampled was in an over-voltage state in the preceding sampling period. The S0, S1, $\overline{S0}$, and $\overline{S1}$ signals provide the decode information as to the battery cell voltage that is currently sampled. The $\overline{C2}$ output of counter 116 provides for synchronization of the data that was entered via the inputs of gates 202, 204, 206 and 208. The output of NOR gate 210 drives the gate of transistor 230. When an over-voltage battery cell is sampled on a subsequent sampling period, hysteresis circuit 200 causes transistor 230 to conduct, providing IHYST to the positive input node of comparator 52, developing a hysteresis voltage across resistors 46, 48 and 50. A current of 1.40 microamps is used to generate the hysteresis voltage VHYST.

Referring now to FIG. 9, the detail of pack sense circuit 240 is shown. Pack sense circuit 240 is a detector circuit that senses the presence of the connection of battery charge control circuit 10 to a battery charger and the presence of the STATUS signal at the gate of transistor 26, indicating that battery charge control circuit 10 is in the sleep mode. The gate of transistor 242 is coupled to node 44. The source of transistor 242 is coupled to the base of transistor 258. The emitter of transistor 258 is coupled through resistor 260 to power supply conductor 30. The drain of transistor 242 is coupled to node 22, operating at ground potential, and to the gate of transistor 268. The source of transistor 268 is coupled to power supply conductor 30. Transistors 246 and 248 are configured as a current mirror. The area of transistor 248 is four times larger than the area of transistor 246. The emitter of transistor 246 is coupled to node 22. The base and collector of transistor 246 and the base of transistor 248 are coupled in common. The emitter of transistor 248 is coupled through resistor 250 to node 22. The collector of transistor 246 is coupled to the collector of transistor 252. Transistors 252, 254 and 256 act as current mirrors with emitters coupled in common to the cell voltage at node 40. The bases of transistors 252, 254 and 256 are coupled in common. The bases of transistors 252, 254 and 256 are coupled to the collector of transistor 256 and to the collector of transistor 258. The collector of transistor 248 is coupled to the base of transistor 262. The emitter of transistor 262 is coupled to node 22. The collector of transistor 262 is coupled through resistor 264 to node 40 and is coupled further to the reset input of UV logic circuit 62 of FIG. 1. The drain of transistor 268 is coupled through resistor 266 to node 40 and is coupled further to provide the PACK STR signal.

The function of pack sense circuit 240 is explained as follows. Battery charge control circuit 10 is placed in a sleep mode as a result of sampling one of battery cells 12, 14, 16 or 18 below the allowable under-voltage limit. In the sleep mode, clock circuit 62 of FIG. 1 is disabled, along with charge pump 88 of FIG. 2. It is necessary to sense when the battery pack, i.e., battery cells 12, 14, 16 and 18, has been placed in a battery charger for recharging of the under-voltage condition so that battery charge control circuit 10 is powered-up to provide the necessary functions to direct the battery charging and balancing processes. Accordingly, transistor 24 is in an off state when any one of battery cells 12, 14, 16 or 18 is in an under-charged state and further discharging of the battery cells is prevented by holding the gate of transistor 24 at a low voltage. Since the gate of transistor 24 is coupled to clock 64, the low voltage disables clock 64 forcing battery charge control circuit 10 into a sleep mode.

Referring briefly again to FIG. 1, when the battery pack is placed in a battery charger, power supply conductors 20 and 30 are coupled to battery charge control circuit 10. Current begins to flow from power supply conductor 20 through resistors 11 and 15, through battery cells 12, 14, 16 and 18, through the back gate of transistor 24, through the drain-source of transistor 26, to power supply conductor 30. Referring back to FIG. 9, when battery charge control circuit 10 is in the sleep mode, prior to placing the battery pack within a battery charger, power supply conductor 30 is floating. As such, transistors 242 and 258 are not conducting, and base drive is not available to transistor 258 to turn on transistor 262. Therefore, the CHG DET output signal is at a logic one level. CHG DET must be at a logic zero to reset UV logic circuit 62 and enable clock 64 of FIG. 1 in order to provide an activation signal to wake battery charge control circuit 10. When the battery pack is coupled to a battery charger, the voltage at power supply conductor 30 becomes negative with respect to the voltage at node 22, which is operating at ground potential. Transistors 242 and 258 begin to conduct, causing the currents in transistors 252 and 254 to increase, providing sufficient base drive to transistor 262 to cause its collector to transfer to a low state. The collector of transistor 262 resets UV logic circuit 62 causing the output of UV logic circuit 62 to transfer to a high state and enabling clock 64 to "wake" battery charge control circuit 10. The gate of transistor 242 is driven high when pack sense circuit 240 is in the process of trying to detect a charging current while battery charge control circuit 10 is in the sleep mode. When the gate of transistor 242 is high, the CHG DET signal is enabled, i.e. at a logic zero, power supply conductor 30 resides at the backgate voltage drop of transistor 24 below the voltage at node 22.

A battery pack placed in a battery charger may have one battery cell in an over-voltage condition while the remainder of the battery cells are within the acceptable voltage range. The over-voltage condition is sensed by over-voltage logic circuit 60 of FIG. 1. Over-voltage logic circuit 60 pulls the gate of charge transistor 26, node 44, to a logic zero, thus turning off transistor 26. Looking again to FIG. 9, the logic zero at node 44 turns off transistor 242. However, since the battery pack is still engaged with the battery charger, the source of transistor 268 is biased at power supply conductor 30 (PACK−) to a voltage that is below ground potential. Since power supply conductor 30 is no longer clamped by the backgate voltage drop of transistor 24, the gate-source voltage of transistor 268 increases past the threshold voltage of transistor 268. The drain of transistor 268 (PACK STR) falls to a logic zero state. The PACK STR signal is coupled to over-current logic circuit 37. The PACK STR signal indicates if the battery pack is coupled to a battery charger during the time that charge transistor 26 is in an off state.

Thus it can be appreciated, as an advantage of the present invention, battery charge control circuit 10 consumes only minimal power when a low battery cell voltage is detected, and battery charge control circuit 10 uses internal intelligence to resume normal functions after insertion in a battery charger has been detected. Therefore, battery charge control circuit 10 does not add further deterioration of an under-voltage battery cell.

In another embodiment of the present invention, the battery balancing function is incorporated as part of a molded battery pack. The battery pack is provided with built-in electronic intelligence functions, and is defined as a smart battery. In the case where a lithium ion or lithium polymer battery is used, the lithium technology battery pack could be plugged into a nickel-cadmium type battery charger. As such, the higher charge rate of the nickel-cadmium battery charger could potentially damage an already charged lithium technology battery cell. The over-current logic circuit 37 of the present invention detects when a lithium technology battery pack is placed in a non-compatible battery charger, and causes the non-compatible battery charger to operate in a trickle charge mode. Thus, the lithium technology battery pack is protected from dangerous overcharging.

Figure 10:
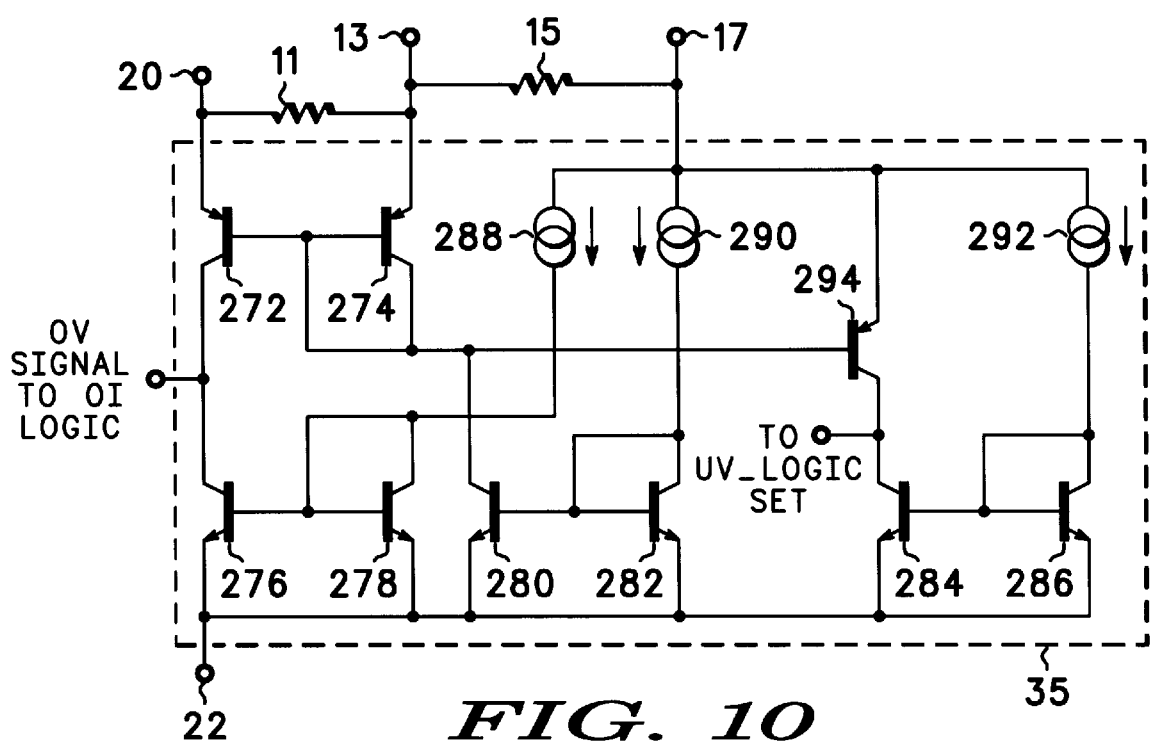
FIG. 10 is a schematic diagram illustrating the over-current detector circuit of FIG. 1.

Referring now to FIG. 10, over-current detector 35 is shown. Transistors 276 and 278 are configured as a current mirror with bases coupled in common to the collector of transistor 278 and with emitters coupled in common to node 22 operating at ground potential. The emitter area of transistor 276 is twice the emitter area of transistor 278. Current source 288 is coupled between node 17 and the collector of transistor 278. The collector of transistor 276 is coupled to an input of over-current logic circuit 37 and is further coupled to a collector of transistor 272. Transistors 272 and 274 are configured as a current mirror with bases coupled in common to the collector of transistor 274. The collector of transistor 274 is coupled to the collector of transistor 280 and to the base of transistor 294. The emitter of transistor 272 is coupled to power supply conductor 20. The emitter of transistor 274 is coupled to node 13. Current sense resistor 11 is coupled between power supply conductor 20 and node 13 to provide a current sensing element for battery cell charging circuit 10. Current sense resistor 15 is coupled between node 13 and node 17. The value of current resistor 11 is 20.0 milliohms and the value of current sense resistor 15 is 20.0 milliohms. Transistors 280 and 282 are configured as a current mirror with bases coupled in common to the collector of transistor 282 and with emitters coupled in common to node 22. Current source 290 is coupled between node 17 and the collector of transistor 282. Transistors 284 and 286 are configured as a current mirror with bases coupled in common to the collector of transistor 286 and with emitters coupled in common to node 22. Current source 292 is coupled between node 17 and the collector of transistor 286. The collector of transistor 284 is coupled to the collector of transistor 294 and to the SET input of under-voltage logic circuit 62. The emitter area of transistor 284 is ten times larger than the emitter area of transistor 286. Current sources 288, 290 and 292 are matched, with equal current flowing in each of the respective current sources. Transistors 272, 274, 276, 278, 280, 282, 284, 286, 288, 290, 292 and 294 could be MOS devices.

The operation of over-current detector 270 proceeds as follows. If the current flowing through current sense resistor 11 from power supply conductor 20 creates a voltage drop that is less than or equal to 16.0 millivolts, the signal provided to over-current logic circuit 37 is a logic zero and the signal provided to the SET input of under-voltage logic circuit 62 is a logic zero. If the current flowing through current sense resistor 11 from power supply conductor 20 creates a voltage drop greater than 16.0 millivolts the signal provided to over-current logic circuit 37 is a logic one. A current flowing from power supply conductor 20 through current sense resistor 11 that generates a voltage drop across current sense resistor 11 greater than 16.0 millivolts indicates that the battery pack has been placed in a battery charger and that the magnitude of the charge current is greater than the current limit set by resistor 11. A voltage drop across current sense resistor 11 that is less than or equal to 16.0 millivolts during the charging process indicates that the battery cell charging current is within an acceptable range for a lithium technology battery pack. If the voltage drop is greater than 16.0 millivolts, an over-current condition is indicated and battery charge control circuit 10 provides a signal to the battery charger that reduces the charging current to a trickle current.

Alternatively, the current flowing into the battery cells can be measured as a function of the voltage drop across transistors 24 and 26.

Current flows through current sense resistor 15 to power supply conductor 20 when the battery pack is used to provide power to a load. If the current flowing through current sense resistor 15 to power supply conductor 20 generates a voltage drop across current sense resistor 15 that is greater than 60.0 millivolts, the signal provided to the SET input of under-voltage logic circuit 62 is a logic one. A voltage drop across current sense resistor 15 that is less than or equal to 60.0 millivolts indicates that the battery cell is discharged within an acceptable current range for a lithium technology battery pack. If the voltage drop is greater than 60.0 millivolts, an over-discharge condition is indicated and battery charge control circuit 10 powers down the charge-discharge balancing circuitry to reduce power drain from the battery pack.

Figure 11:
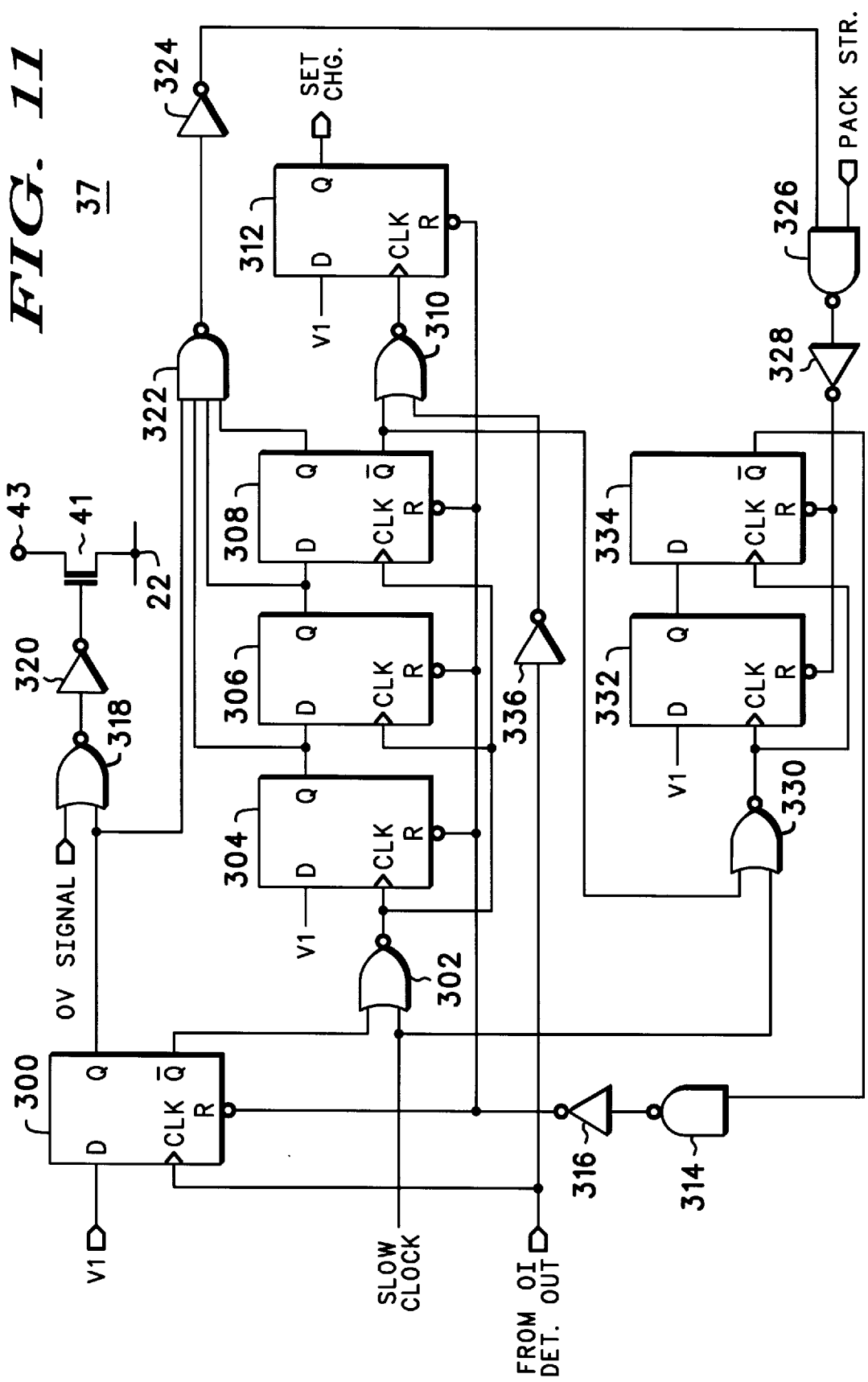
FIG. 11 is a schematic diagram of the over-current logic circuit of FIG. 1.

Referring now to FIG. 11, details of over-current logic circuit 37 are shown. Battery cell voltage VI is coupled to the DATA inputs of flip-flops 300, 304, 312 and 332. Battery cell voltage V1 is the voltage between node 40 and node 22 of FIG. 1 and is selected to be voltage compatible with the circuitry of flip-flops 300, 304, 312 and 332 and represents a logic one signal to the respective DATA inputs of the flip-flops. The output of over-current detector circuit 35 of FIG. 1 is coupled to the CLOCK input for flip-flop 300 and to the input for inverter 336. The Q-output of flip-flop 300 is coupled to one input of NOR gate 318 and to one input of NAND gate 322. The $\overline{Q}$-output of flip-flop 300 is coupled to a first input of NOR gate 302. A second input of NOR gate 302 is coupled to SLOW CLOCK signal output of control circuit 32 of FIG. 1. The SLOW CLOCK signal is also-coupled to an input of NOR gate 330. SLOW CLOCK is a derivative of SYSCLK and has a period of approximately one second. The output of NOR gate 302 is coupled in common to the CLOCK inputs of flip-flops 304, 306 and 308. The Q-output of flip-flop 304 is coupled to the D-input of flip-flop 306 and to the second input of NAND gate 322. The Q-output of flip-flop 306 is coupled to the D-input of flip-flop 308 and to the third input of NAND gate 322. The Q-output of flip flop 308 is coupled to the fourth input of NAND gate 322. The output of NAND gate 322 is coupled to the input of inverter 324. The output of inverter 324 is coupled to the an input of NAND gate 326. Another input of NAND gate 326 is coupled for receiving the PACK STR signal from pack sense 240 of FIG. 1. The output of NAND gate 326 is coupled to an input of inverter 328. The output of inverter 328 is coupled in common to the reset inputs of flip-flops 332 and 334. The CLK input of flip-flop 332 is coupled to the output of NOR gate 330 and to the CLK input of flip-flop 334. The Q-output of flip-flop 332 is coupled to the DATA input of flip-flop 334. The $\overline{Q}$-output of flip-flop 334 is coupled to the input of NAND gate 314. A second input of NAND gate 314 (not shown) is available for testability purposes. The output of NAND gate 314 is coupled to the input of inverter 316. The output of inverter 316 is coupled to the reset inputs of flip-flops 300, 304, 306, 308 and 312. An input of NOR gate 310 is coupled to the output of inverter 336. Another input of NOR gate 310 is coupled to the $\overline{Q}$-output of flip-flop 308 and to a second input of NOR gate 330. The output of NOR gate 310 is coupled to the CLOCK input of flip-flop 312. The Q-output of flip-flop 312 provides the SET CHG signal to NOR gate 39 of FIG. 2. A second input of NOR gate 318 is coupled to receive the OV signal from over-current logic circuit 37 of FIG. 1. The output of NOR gate 318 is coupled to an input of inverter 320. The output of inverter 320 is coupled to the gate of transistor 41. The source of transistor 41 is coupled to node 22, operating at ground potential. The drain of transistor 41 is coupled to node 43.

Referring again to FIG. 11, the operation of over-current logic circuit proceeds as follows. Feedback provided by flip-flop 334 to the RESET inputs of flip-flops 300, 304, 306, 308 and 312 drives all Q-outputs of the flip-flops to a logic zero. The output of inverter 324 then drives flip-flops 332 and 334 to a logic zero state, thus resetting over-current logic circuit 37. The logic zero forces flip-flops 332 and 334 to operate in a reset mode with the $\overline{Q}$-output of flip-flop 334 at a logic one. Thus, flip-flops 332 and 334 have no effect on over-current logic circuit 37 when the battery pack is in a charger. If an over-voltage condition is detected when the battery pack is placed in a battery charger, a logic one is input via the OV signal to the input of NOR gate 318. If an over-current condition is detected when the battery pack is placed in a battery charger, the signal from OI DETECT output rises to a logic one, clocking the V1 signal into the data input of flip-flop 300, causing the Q-output of the flip-flop to pull to a logic one. The logic one is input to the second input of NOR gate 318. A logic one on either input of NOR gate 318 forces the gate of transistor 41 high, and in turn, forces the drain of transistor 41 to a logic zero at node 43. A logic zero at node 43 indicates to the external battery charger that the charging current of the battery charger needs to be reduced to prevent damaging the battery cells in the battery pack. If the over-current condition persists, transistor 41 is maintained in an on state until the battery pack is removed from the battery charger.

If the over-current charging condition continues, the operation of over-current logic circuit 37 proceeds as follows. The signal from the over-current detector output remains high as long as the over-current condition persists. With the V1 signal clocked to the Q-output of flip-flop 300, the $\overline{Q}$-output of flip-flop 300 is forced to a zero logic state. The $\overline{Q}$-output logic zero enables NOR gate 302 to pass the SLOW CLOCK to the CLOCK inputs of flip-flops 304, 306 and 308. The Q-outputs of flip-flops 304, 306 and 308 sequentially transition to a logic one level and create a time delay between the DATA input of flip-flop 304 and the $\overline{Q}$-output of flip-flop 308. If the OI DETECT output signal is still at a logic one, indicating that the charging current from the battery charger is remaining in an over-current condition, inverter 336 forces the second input of NOR gate 310 to a logic zero, causing a CLOCK transition at the input of flip-flop 312. The Q-output of flip-flop 312 is driven to a logic one state and the SET CHG signal is propagated to OV logic circuit 60 of FIG. 1 and pulls the gate of transistor 26 low, thus disabling the conduction path between power supply conductors 20 and 30.

Looking further at FIG. 11, if the OI DETECT output signal returns to a logic zero state prior to the V1 signal propagating through flip-flops 304, 306 and 308, the output of NOR gate 310 is forced to a logic zero state. The SET CHG signal remains at a logic zero state and allows OV logic circuit 60 to perform its battery cell overcharge balancing function.

If the OI DETECT output signal returns to a logic zero after flip-flops 304, 306 and 308 have been loaded with logic ones, flip-flop 312 does not clock a logic one. Since NOR gate 330 has been enabled by flip-flop 308, after two successive SLOW CLOCK pulses, the $\overline{Q}$-output of flip-flop 334 is forced to a logic zero. The logic zero is applied to the RESET inputs of flip-flops 300, 304, 306, 308 and 312 via NAND gate 314 and inverter 316, thus re-initializing over-current logic circuit 37 for sensing future over-voltage and over-current charging conditions. It therefore can be readily appreciated that the over-current logic circuit of the present invention protects the battery cells of the battery pack when the battery pack is placed in a battery charger having a charging current that is not compatible with the battery cell technology.

Figure 12:
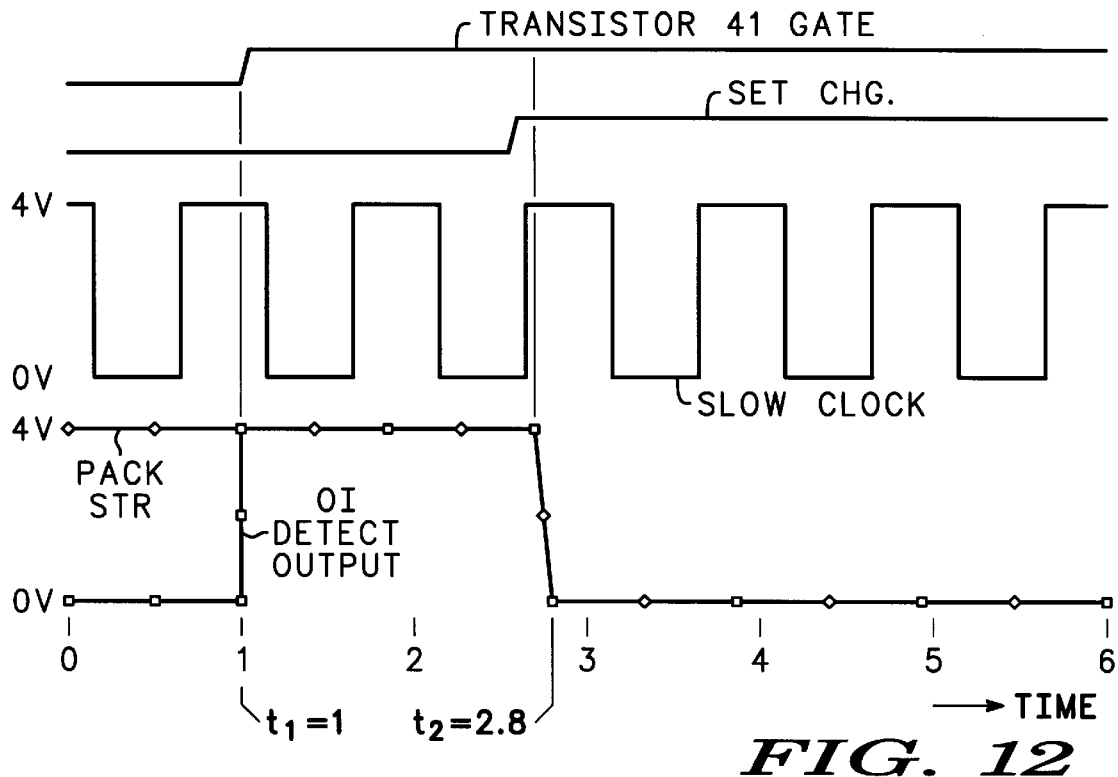
FIG. 12 is a table illustrating the operation of the over-current logic circuit of FIG. 11.

Referring now to FIG. 12, a timing diagram showing the details of the operation of over-current logic circuit 37 of battery charge control circuit 10 is shown. At time zero, the battery pack is connected to the battery charger. At approximately $t_1$=1.0 seconds, over-current detect circuit 35 senses that an over-current condition exists in the battery pack and drives the gate of transistor 41 causing transistor 41 to conduct. At approximately $t_2$=2.8 seconds, the SET CHG signal is driven to a logic one state, turning off CHARGE transistor 26, which in turn turns off transistor 242 of FIG. 9. If a charge current is still applied, PACK−, node 30, is driven to a voltage level below that of node 22 causing the PACK STR signal to be driven to a logic zero.

It can further be appreciated that as an advantage of the present invention, as long as PACK STR resides at a logic zero, the gate of transistor 41 and the SET CHG output are driven high, thus continuing to interrupt potentially hazardous overcharge conditions.

Figure 13:
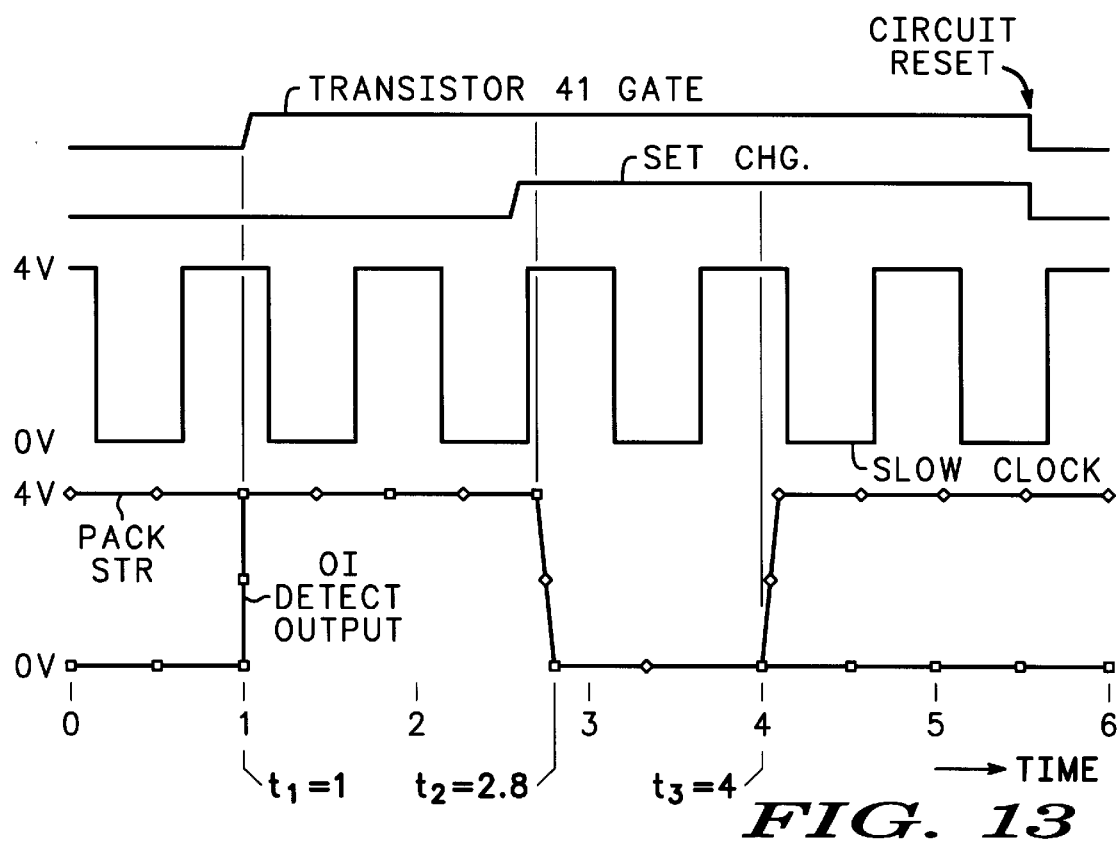
FIG. 13 is a table illustrating the operation of the over-current logic circuit of FIG. 11.

Referring now to FIG. 13, a timing diagram showing the details of the operation of over-current logic circuit 37 of battery charge control circuit 10 is shown. At time zero, the battery pack is connected to the battery charger. At approximately $t_1$=1.0 second, over-current detect circuit 35 senses that an over-current condition exists in the battery pack and drives the gate of transistor 41 causing transistor 41 to conduct. At approximately $t_2$=2.8 seconds, the SET CHG signal is driven to a logic one state, turning off CHARGE transistor 26, which in turn turns off transistor 242 of FIG. 9, causing the PACK STR signal to be driven to a logic zero. Again, the battery charger pulls PACK−, node 30, to a voltage below that of node 22. At approximately $t_3$=4.0 seconds, the battery pack is removed from the battery charger, driving the PACK STR signal to a logic one state. The logic one PACK STR signal enables flip-flops 332 and 334 of FIG. 9 to clock a reset signal to flip-flops 300, 304, 306, 308 and 312 of over-current logic circuit 37 to re-initialize over-current logic circuit 37 for the next insertion into a battery charger.

Turning now to FIG. 14, a table has been constructed to identify various operating modes of battery charge control circuit 10.

By now it can be truly appreciated that the present invention provides an intelligent battery charge control circuit with cell balancing features that prolong battery pack lifetime by maintaining an equal charge amongst all the cells in the battery pack. The circuit samples battery voltages and accordingly controls the voltage characteristics of individual battery cells in a battery pack. The circuit senses when the battery pack is placed in a battery charger and prevents the battery pack from exposure to hazardous and potentially destructive over-charging currents from foreign chargers.

While specific embodiments of the present invention have been shown and described, further modifications and improvements will occur to those skilled in the art. It is understood that the invention is not limited to the particular forms shown and it is intended for the appended claims to cover all modifications which do not depart from the spirit and scope of this invention.

What is claimed is:

1. A battery control circuit, comprising:
   a measurement circuit that provides a status signal upoon provides voltage condition, the measurement circuit including:
   a first multiplexer having a first signal input, a second signal input, a first select input, a second select input and an output, the first and second signal inputs of the first multiplexer selected in response to selection signals appearing at the first and second select inputs;
   a second multiplexer having a first signal input, a second signal input, a first select input, a second select input, and an output, the first and second signal inputs of the second multiplexer selected in response to the selection signals appearing at the first and second select inputs;
   a voltage divider circuit coupled between the outputs of the first and second multiplexers, the voltage divider circuit having an output node;
   a comparator having first and second inputs and an output, the first input selectively coupled to the output node of the voltage divider circuit, and the output providing the status signal;
   a control circuit responsive to said status signal for decoding a control signal from said status signal; and
   a discharge circuit coupled between the control circuit and the first multiplexer and operating in response to said control signal.

2. The battery charge control circuit of claim 1, further including:
   a first battery cell having a first terminal and a second terminal, the first terminal coupled to the first input of the first multiplexer, the second terminal coupled to the second input of the first multiplexer and to the first input of the second multiplexer; and a second battery cell having a first terminal and a second terminal, the first terminal coupled to the second input of the first multiplexer and the second terminal coupled to the second input of the second multiplexer.

3. The battery charge control circuit of claim 2, wherein said measurement circuit is coupled for receiving a second battery voltage from said second battery cell and providing a status signal upon sensing an over-voltage condition in said second battery cell, and said control circuit is responsive to said status signal for decoding a second battery control signal from said status signal, and said discharge circuit is coupled across said second battery cell and operating in response to said second battery control signal for discharging the second battery cell and achieving a balanced condition between said first and second battery voltages.

4. The battery control circuit of claim 1, wherein the voltage divider circuit comprises:
   a first resistor having first and second terminals, said first terminal coupled to said output of said first multiplexer; and
   a second resistor having first and second terminals, said first terminal of said second resistor coupled to said first terminal of the first resistor and the second terminal of the second resistor coupled to the output of the second multiplexer.

5. The battery control circuit of claim 1, wherein the control signal is an over-voltage control signal.

6. The battery control circuit of claim 1, wherein the control signal is an under-voltage control signal.

7. The battery control circuit of claim 1, wherein the discharge circuit includes a first discharge transistor having a control electrode and first and second current carrying electrodes, wherein the first current carrying electrode is coupled to the first signal input of the first multiplexer, the second current carrying electrode is coupled to the second signal input of the first multiplexer, and the control electrode is coupled to the control circuit.

8. The battery control circuit of claim 7, wherein the first discharge transistor is a field effect trnansistor.

9. The batter control circuit of claim 7, wherein the discharge circuit further includes a second discharge transistor having a control electrode and first and second current carrying electrodes, wherein the first current carrying electrode is coupled to the first signal input of the first multiplexer, the second current carrying electrode is coupled to the second signal input of the first multiplexer, and the control electrode is coupled to the control circuit.

10. A battery charge control circuit for sensing a connection of the battery cell to a battery charger, comprising:
   a measurement circuit coupled for receiving a first battery voltage between first and second terminals and having an output for,providing one of a first status signal upon sensing a first voltage condition in the battery cell or a second status signal upon sensing a second voltage condition in the battery cell, the measurement circuit including:
      a first multiplexer having a first signal input, a second signal input, a first select input, a second select input, and an output, the first and second signal inputs of the first multiplexer selected in response to selection signals appearing at the first and second select inputs;
      a second multiplexer having a first signal input, a second signal input, a first select input, a second select input, and an output, the first and second signal inputs of the second multiplexer selected in response to the selection signals appearing at the first and second select inputs;
   a voltage divider circuit coupled between the outputs of the first and second multiplexers, the voltage divider circuit having an output node;
   a comparator having first and second inputs and an output, the first input selectively coupled to the output node of the voltage divider circuit, and the output providing the first status signal;
   a first logic circuit having an input coupled to the output of said measurement circuit and having an output;
   a second logic circuit having a first input coupled for receiving said first status signal, a second input, and an output responsive to said first status signal;
   a first transistor having a gate coupled to the output of said first logic circuit, a source coupled to a third terminal, and a drain;
   a second transistor having a gate coupled to the output of said second logic circuit, a drain coupled to said drain of said first transistor, and a source coupled to said second terminal; and
   a detector circuit having a first input coupled to said source of said first transistor for detecting a first voltage, a second input coupled to said output of said first logic circuit, a third input coupled for detecting a voltage at said second terminal, and an output coupled to said input of said second logic circuit and responsive to a differential of said first voltage and said voltage at said second terminal for providing an activation signal.

11. The battery charge control circuit of claim 10, wherein said first voltage condition is an undervoltage condition and said second voltage condition is an overvoltage condition.

12. The battery charge control circuit of claim 11, wherein said first logic circuit comprises:
   an OR gate having first and second inputs and an output;
   a first flip-flop having a data input, a clock input, and an output, wherein the output of the first flip-flop is coupled to the first input of the OR gate;
   a second flip-flop having a data input, a clock input, and an output, wherein the data input of the second flip-flop is coupled to the output of the first flip-flop,
   a NOR gate having first and second inputs and an output;
   a first transistor having a control electrode coupled to the output of the NOR gate via an inverter, and first and second current carrying electrodes;
   a second transistor having a control electrode and first and second current carrying electrodes, wherein the second current carrying electrode of the second transistor is coupled to the first current carrying electrode of the first transistor;
   a third transistor having a control electrode and first and second current carrying electrodes, wherein the control electrode of the third transistor is coupled to the output of the NOR gate and the second current carrying electrode of the third transistor is coupled to the second current carrying electrode of the first transistor;
   a fourth transistor having a control electrode and first and second current carrying electrodes, wherein the control electrode of the fourth transistor is coupled to the second current carrying electrode of the second transistor, the second current carrying electrode of the fourth transistor is coupled to the first current carrying electrode of the third transistor, and the first current carrying electrodes of the second and fourth transistors are commonly coupled;

a fifth transistor having a control electrode coupled to the control electrode of the fourth transistor, a first current carrying electrode coupled to the first current carrying electrodes of the third and fourth transistors, and a second current carrying electrode;

a sixth transistor having a control electrode and first and second current carrying electrodes, wherein the first current carrying electrode of the sixth transistor is coupled to the second current carrying electrode of the fifth transistor;

a seventh transistor having a control electrode and first and second current carrying electrodes, wherein the control electrode of the seventh transistor is coupled to the second current carrying electrode of the fifth transistor, the second current carrying electrode of the seventh transistor is coupled to the second current carrying electrode of the sixth, and the control electrode of the sixth transistor is coupled to the first current carrying electrode of the seventh transistor;

an eighth transistor having a control electrode and first and second current carrying electrodes, wherein the control electrode of the eighth transistor is coupled to the control electrode of the second transistor, the second current carrying electrode of the eighth transistor is coupled to the first current carrying electrode of the seventh transistor, and the first current carrying electrode of the eighth transistor is coupled to the first current carrying electrode of the fifth transistor; and a ninth transistor having a control electrode and first and second current carrying electrodes, wherein the control electrode of the ninth transistor is coupled to the control electrode of the sixth transistor, and the second current carrying electrode of the ninth transistor is coupled to the second current carrying electrode of the seventh transistor.

13. The battery charge control circuit of claim 12, wherein the first, second, third, fourth, fifth, sixth, seventh, eighth, and ninth transistors are field effect transistors.

14. The battery charge control circuit of claim 10 wherein said detector circuit further comprises:

a third transistor having a gate coupled to said output of said first logic circuit, a source, and a drain;

a fourth transistor having a base coupled to said source of said third transistor, an emitter coupled to said third terminal, and a collector;

a fifth transistor having a collector and a base coupled to said collector of said fourth transistor, and an emitter coupled to said first terminal;

a sixth transistor having a base coupled to said base of said fifth transistor, an emitter coupled to said first terminal, and a collector;

a seventh transistor having a base coupled to said base of said sixth transistor, an emitter coupled to said first terminal, and a collector;

an eighth transistor having a collector and a base coupled to said collector of said seventh transistor, and an emitter coupled to said second terminal;

a ninth transistor having a base coupled to said base of said eighth transistor, an emitter coupled to said second terminal, and a collector coupled to said collector of said sixth transistor;

a tenth transistor having a base coupled to said collector of said ninth transistor, an emitter coupled to said third terminal, and a collector coupled to said first terminal; and an eleventh transistor having a gate coupled to said second terminal, a source coupled to said third terminal, and a drain coupled to said first terminal.

15. The battery charge control circuit of claim 14 wherein said detector circuit further comprises:

a first resistor having a first terminal coupled to said emitter of said ninth transistor and a second terminal coupled to said second terminal of said detector circuit;

a second resistor having a first terminal coupled to said emitter of said fourth transistor and a second terminal coupled to said third terminal of said detector circuit;

a third resistor having a first terminal coupled to said collector of said tenth transistor and a second terminal coupled to said first terminal of said detector circuit; and a fourth resistor having a first terminal coupled to said drain of said eleventh transistor and a second terminal coupled to said first terminal of said detector circuit.

16. The battery control circuit of claim 10, wherein the voltage divider circuit comprises: a first resistor having first and second terminals, said first terminal coupled to said output of said first multiplexer; and a second resistor having first and second terminals, said first terminal of said second resistor coupled to said first terminal of the first resistor and the second terminal of the second resistor coupled to the output of the second multiplexer.

17. The battery charge control circuit of claim 4, further including:

a third resistor coupled between the first and second resistors, wherein a connection between the second and third resistors form a second node; and a switching circuit having first and second input terminals, a control terminal, and an output terminal, said first input terminal selectively coupled to said first node, said second input terminal selectively coupled to said second node, said output terminal coupled to said first input of said comparator.

18. The battery charge control circuit of claim 17 wherein said control circuit is responsive to a system clock for generating said select signal for said first and second multiplexers.

19. A method of charging cells of a battery, comprising the steps of:

multiplexing first and second cells of the battery with a selection signal to produce a first terminal voltage of a selected cell at a first node while concurrently producing a second terminal voltage of the selected cell at a second node with the selection signal;

subtracting the second terminal voltage from the first terminal voltage to produce a difference signal; and comparing the difference signal to a reference signal to produce a charge control signal representative of a charge of the selected cell.

20. The method of claim 19, further comprising the step of discharging the selected cell in response to the charge control signal.

21. The method of claim 19, wherein the step of subtracting includes the step of voltage dividing the first and second selected potentials to produce the difference signal.

22. A circuit for charging battery cells, comprising:

a multiplexer having a first input coupled across a first battery cell and a second input coupled across a second battery cell, and selecting between the first and second battery cells with a selection signal to provide a potential of a selected cell across first and second outputs; and a comparator having a first input coupled for receiving the potential of the selected cell, a second input coupled for receiving a reference signal and an output for providing a charge control signal representative of a charge of the selected cell.

23. The circuit of claim 22, further comprising:

a first discharge circuit having an enable input coupled for receiving the selection signal and first and second terminals coupled for discharging the first battery cell when the charge control signal is in a first state; and a second discharge circuit having an enable input coupled for receiving the selection signal and first and second terminals coupled for discharging the second battery cell when the charge control signal is in a second state.

24. The circuit of claim 23, further comprising a voltage divider having first and second inputs coupled to the first and second outputs of the multiplexer, and an output coupled to the first input of the comparator.

* * * * *

UNITED STATES PATENT AND TRADEMARK OFFICE
CERTIFICATE OF CORRECTION

PATENT NO. : 5,818,201
DATED : October 6, 1998
INVENTOR(S) : Troy L. STOCKSTAD et al.

It is certified that error appears in the above-identified patent and that said Letters Patent is hereby corrected as shown below:

In column 18, claim 1, line 37, replace "upoon" with --upon--.

In column 18, claim 1, line 38, replace "provides" with --sensing a--.

Signed and Sealed this

Sixth Day of July, 1999

*Attest:*

Q. TODD DICKINSON

*Attesting Officer*     Acting Commissioner of Patents and Trademarks